United States Patent
Sawa et al.

(10) Patent No.: US 9,443,648 B2
(45) Date of Patent: Sep. 13, 2016

(54) MAGNETIC SHEET FOR NON-CONTACT POWER RECEIVING DEVICE, NON-CONTACT POWER RECEIVING DEVICE, ELECTRONIC APPARATUS, AND NON-CONTACT CHARGER

(71) Applicants: KABUSHIKI KAISHA TOSHIBA, Tokyo (JP); TOSHIBA MATERIALS CO., LTD., Yokohama-shi, Kanagawa (JP)

(72) Inventors: Takao Sawa, Yokohama (JP); Katsuhiko Yamada, Yokohama (JP); Tadao Saito, Yokohama (JP); Kiyoshi Nagasaki, Yokohama (JP)

(73) Assignees: KABUSHIKI KAISHA TOSHIBA, Minato-Ku (JP); TOSHIBA MATERIALS CO., LTD., Yokohama-Shi (JP)

( * ) Notice: Subject to any disclaimer, the term of this patent is extended or adjusted under 35 U.S.C. 154(b) by 198 days.

(21) Appl. No.: 14/271,780

(22) Filed: May 7, 2014

(65) Prior Publication Data
US 2014/0239892 A1    Aug. 28, 2014

Related U.S. Application Data

(63) Continuation of application No. PCT/JP2012/007133, filed on Nov. 7, 2012.

(30) Foreign Application Priority Data

Nov. 8, 2011    (JP) ................. 2011-244955

(51) Int. Cl.
| | |
|---|---|
| H02J 7/00 | (2006.01) |
| H01F 7/02 | (2006.01) |
| H01F 38/14 | (2006.01) |
| H01F 3/02 | (2006.01) |
| H01F 27/245 | (2006.01) |
| H02J 7/02 | (2016.01) |
| H01F 3/10 | (2006.01) |
| H01F 27/36 | (2006.01) |
| H01F 17/00 | (2006.01) |

(52) U.S. Cl.
CPC .............. *H01F 7/0247* (2013.01); *H01F 3/02* (2013.01); *H01F 3/10* (2013.01); *H01F 27/245* (2013.01); *H01F 27/365* (2013.01); *H01F 38/14* (2013.01); *H02J 7/0042* (2013.01); *H02J 7/025* (2013.01); *H01F 2017/0066* (2013.01); *Y10T 428/24314* (2015.01); *Y10T 428/24942* (2015.01); *Y10T 428/24967* (2015.01); *Y10T 428/31678* (2015.04)

(58) Field of Classification Search
CPC ...... H02J 7/025; H01F 38/14; Y02T 90/122; B60L 11/182; Y02E 60/12
USPC ......................................................... 320/108
See application file for complete search history.

(56) References Cited

U.S. PATENT DOCUMENTS

| | | | | |
|---|---|---|---|---|
| 4,368,496 A | * | 1/1983 | Kato | ...................... G11B 5/105 360/110 |
| 5,821,731 A | * | 10/1998 | Kuki | .................. B60L 11/1805 320/108 |
| 8,193,767 B2 | | 6/2012 | Inoue et al. | |
| 8,232,764 B2 | | 7/2012 | Inoue et al. | |
| 2009/0058358 A1 | | 3/2009 | Inoue et al. | |
| 2009/0121677 A1 | | 5/2009 | Inoue et al. | |
| 2009/0206791 A1 | * | 8/2009 | Jung | ...................... H02J 7/025 320/108 |
| 2009/0284341 A1 | | 11/2009 | Okada et al. | |
| 2010/0156344 A1 | | 6/2010 | Inoue et al. | |
| 2010/0181842 A1 | | 7/2010 | Suzuki et al. | |
| 2013/0293191 A1 | | 11/2013 | Hidaka et al. | |

FOREIGN PATENT DOCUMENTS

| | | |
|---|---|---|
| JP | 09-190938 A | 7/1997 |
| JP | 11-265814 A | 9/1999 |
| JP | 2000-023393 A | 1/2000 |
| JP | 2009-005475 A | 1/2009 |
| JP | 2009-277820 A | 11/2009 |
| JP | 2010-283263 A | 12/2010 |
| JP | 2012-156280 A | 8/2012 |
| WO | WO 2007/080820 A1 | 7/2007 |
| WO | WO 2007/111019 A1 | 10/2007 |
| WO | WO 2007/122788 A1 | 11/2007 |

OTHER PUBLICATIONS

System Description Wireless Power Transfer, Volume I: Low Power, Part 1: Interface Definition, Version 1.0.1., Oct. 2010, pp. 1-76.

* cited by examiner

*Primary Examiner* — Arun Williams
(74) *Attorney, Agent, or Firm* — Foley & Lardner LLP

(57) ABSTRACT

A magnetic sheet of an embodiment includes a laminate of a plurality of magnetic thin plates. The laminate constituting the magnetic sheet includes a first magnetic thin plate and a second magnetic thin plate different in kind from the first magnetic thin plate. The first magnetic thin plate has a magnetostriction constant exceeding 5 ppm in an absolute value, and the second magnetic thin plate has a magnetostriction constant of 5 ppm or less in an absolute value. Alternatively, the first magnetic thin plate has a thickness of from 50 to 300 μm, and the second magnetic thin plate has a thickness of from 10 to 30 μm.

13 Claims, 9 Drawing Sheets

MAGNETIC SHEET FOR NON-CONTACT POWER RECEIVING DEVICE, NON-CONTACT POWER RECEIVING DEVICE, ELECTRONIC APPARATUS, AND NON-CONTACT CHARGER

CROSS-REFERENCE TO RELATED APPLICATIONS

This application is a continuation of prior International Application No. PCT/JP2012/007133 filed on Nov. 7, 2012, which is based upon and claims the benefit of priority from Japanese Patent Application No. 2011-244955 filed on Nov. 8, 2011; the entire contents of all of which are incorporated herein by reference.

FIELD

Embodiments described herein relate generally to a magnetic sheet for non-contact power receiving device, and a non-contact power receiving device, an electronic device, and a non-contact charger.

BACKGROUND

A portable communication device has developed remarkably in recent years, and especially a cellular phone is being rapidly reduced in size, weight, and thickness. Other than the cellular phone, an electronic apparatus such as a video camera (handy camera or the like), a codeless telephone, or a lap-top personal computer (note type personal computer), is being reduced in size, weight, and thickness. The above can be used without being connected to a plug as a result that a secondary battery is mounted on an electronic apparatus main body, which increases portability and convenience. At present, the secondary battery is limited in capacity and it is necessary for the secondary battery to be charged once in several days to several weeks.

As a charging method, there are a contact charging method and a non-contact charging method. The contact charging method is a method in which an electrode of a power receiving device and an electrode of a power feeding device are made to contact directly and charging is performed. The contact charging method is generally used since its device structure is simple. However, as the electronic apparatus is reduced in size, weight, and thickness in recent years, the weight of the electronic apparatus becomes smaller, so that a contact pressure between the electrode of the power receiving device and the electrode of the power feeding device becomes insufficient, causing a problem that a charging defect occurs. Further, since the secondary battery is weak against heat, it is necessary to design a circuit so that excessive discharging or excessive charging does not occur, to prevent temperature rise of the battery. In view of the above, application of the non-contact charging method is being studied.

The non-contact charging method is a method in which both a power receiving device and a power feeding device are provided with coils and charging is performed by using electromagnetic induction. In the non-contact charging method, since it is not necessary to consider a contact pressure between electrodes, a charging voltage can be supplied stably without being influenced by a state of contact between the electrodes. As the coil for the non-contact charger, there are known a structure in which a coil is wound around a ferrite core, a structure in which a coil is mounted on a resin substrate where a ferrite powder or an amorphous powder is mixed, and so on. However, ferrite, becoming fragile if processed to be thin, has a problem of being weak in impact resistance and being apt to cause a defect in a power receiving device by dropping or the like of the apparatus.

In order to make a power receiving portion thinner to cope with decrease in thickness of an apparatus, it is studied to adopt a flat coil formed by printing a metal powder paste spirally on a substrate. However, a magnetic flux passing through the flat coil interlinks a substrate or the like inside the apparatus, there is a problem that an eddy current generated by electromagnetic induction causes heat generation in the apparatus. Thus, a large power cannot be transmitted and a charging time becomes long. Concretely, while it takes about 90 minutes for a contact charger to charge a cellular phone, it takes about 120 minutes for a non-contact charger to charge.

In a power receiving device to which a conventional non-contact charging method is applied, a measure against an eddy current generated by electromagnetic induction is not sufficient. Since the power receiving device has a secondary battery, it is required to suppress generation of heat to the utmost. Since the power receiving device is mounted on an electronic apparatus main body, generation of heat has a negative effect to a circuit component. Due to the above, a large power cannot be transmitted at a time of charging and a charging time becomes long. Further, generation of an eddy current leads to generation of a noise, which causes reduction of a charging efficiency. It is suggested, as a measure against the above, to provide a magnetic thin plate in a predetermined position of the power receiving device. By controlling a magnetic permeability and a plate thickness of the magnetic thin plate, or a saturation magnetic flux density and a plate thickness of the magnetic thin plate, heat generation by the eddy current, generation of the noise, reduction of the power receiving efficiency, and so on are suppressed.

A non-contact charging method is suggested in which a magnet is disposed in a power feeding side of a non-contact charger and positioning of an apparatus of a power receiving side is carried out. For example, in WPC (Wireless Power Consortium) being an international standard, a non-contact charger in which positioning is carried out by a magnet is described in "System Description Wireless Power Transfer, volume 1: Low Power Part 1: interface Definition version 1.0, July, 2010".

When positioning is carried out by a magnet, magnetic saturation occurs in a conventional magnetic thin plate and a magnetic shield effect is substantially reduced. Thus, there is an apprehension that temperature rise of a secondary battery is brought about at a time of charging and that a cycle life time of the secondary battery is reduced. A conventional magnetic shield has a magnetic thin plate with a saturation magnetic flux density of 0.55 to 2 T (5.5 to 20 kG), for example, and such (a) magnetic thin plate (s), in a range of one to three or less, is (are) laminated. Even if a laminate of the magnetic thin plates is used as magnetic shield, there is a possibility that a magnetic field generated from a magnet disposed in a power feeding device easily causes magnetic saturation of the magnetic shied, a function as the magnetic shield not being exhibited.

In a present international standard of the non-contact charging method, there are a method of using a magnet and a method of not using a magnet in positioning of an apparatus in a power receiving side. Since a magnetic thin plate used in the conventional magnetic shield is excellent in soft magnetic characteristic, use of a laminate in a range of one or three or less magnetic thin plate(s) with a saturation magnetic flux density of 0.55 to 2 T causes magnetic saturation easily, if a magnet exists in the neighborhood. Under the circumstances, a magnetic sheet for non-contact power receiving device is desired which enables a sufficient magnetic shield effect and a high charging efficiency independently of existence/absence of a magnet in a power feeding device side.

BRIEF DESCRIPTION OF THE DRAWINGS

Fig. is a cross-sectional view showing a magnetic sheet of a first embodiment.

DETAILED DESCRIPTION

According to one embodiment, there is provided a magnetic sheet for non-contact power receiving device. The magnetic sheet includes a laminate of a plurality of magnetic thin plates. The laminate in the magnetic sheet has two or more kinds of the magnetic thin plates.

Hereinafter, a magnetic sheet for non-contact power receiving device according to an embodiment and a non-contact power receiving device, an electronic apparatus, and a non-contact charger which use the same will be described.

The magnetic sheet for non-contact power receiving device of the embodiment includes a laminate of a plurality of magnetic thin plates. The laminate constituting the magnetic sheet includes two or more kinds of magnetic thin plates. In other words, the laminate includes at least a first magnetic thin plate and a second magnetic thin plate different in kind from the first magnetic thin plate. The different in kind means that magnetic characteristic such as a magnetostriction constant, thickness, composing material, or the like of the magnetic thin plate are different. The laminate can include a third or more magnetic thin plate(s) different in kind from the first and the second magnetic thin plates. The kinds of the magnetic thin plates are not limited in particular as long as two or more kinds are used, but it is preferable that four kinds or less, further, three kinds or less are used when a manufacturability including procurement of the composing materials (raw materials) is considered.

Figure 1:
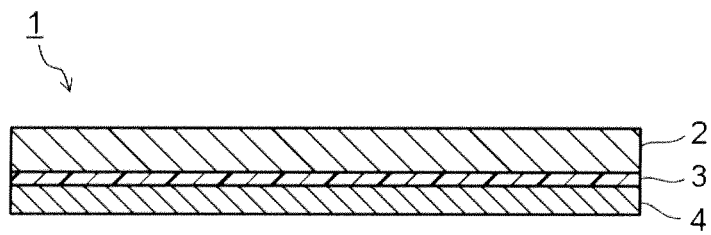
Figure 2:
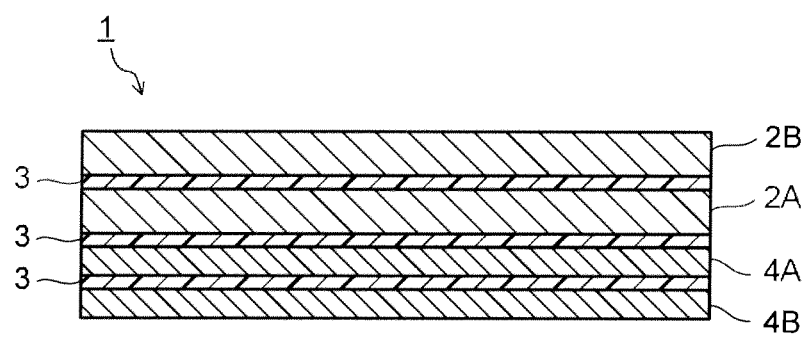
FIG. 2 is a cross-sectional view showing a magnetic sheet of a second embodiment.
Figure 3:
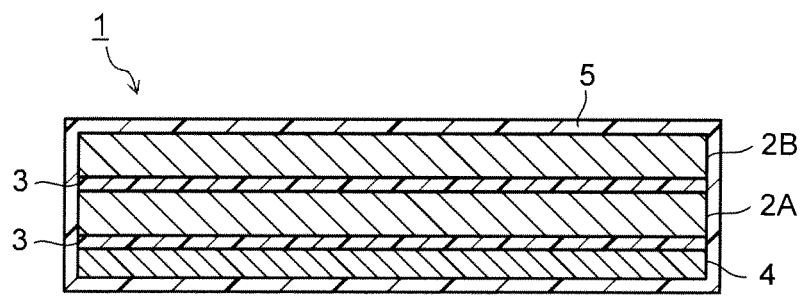
FIG. 3 is a cross-sectional view showing a magnetic sheet of a third embodiment.

FIG. 1 shows a magnetic sheet for non-contact power receiving device of a first embodiment. FIG. 2 shows a magnetic sheet for non-contact power receiving device of a second embodiment. FIG. 3 shows a magnetic sheet for non-contact power receiving device of a third embodiment. In those drawings, a reference numeral 1 indicates a magnetic sheet for non-contact power receiving device, a reference numeral 2 indicates a first magnetic thin plate, a reference numeral 3 indicates an adhesive layer portion, and a reference numeral 4 indicates a second magnetic thin plate different in kind from the first magnetic thin plate 2. It is preferable that the first magnetic thin plate 2 is a magnetic thin plate which is hard to be magnetic-saturated even if a magnet exists in a power feeding device side. It is preferable that the second magnetic thin plate 4 is a magnetic thin plate capable of obtaining a high magnetic permeability at a used frequency of a power receiving device. As a result of disposing in an electronic apparatus the magnetic sheet 1 made by laminating the first magnetic thin plate 2 which is hard to be magnetic-saturated and the second magnetic thin plate 4 having the high magnetic permeability, heat generation, generation of a noise, reduction of a power receiving efficiency or the like can be suppressed regardless of existence/absence of positioning by a magnet in the power feeding device side in a non-contact charger.

The adhesive layer portion 3 is provided between the first magnetic thin plate 2 and the second magnetic thin plate 4. The adhesive layer portion 3 is preferable to be provided at least between the first magnetic thin plate 2 and the second magnetic thin plate 4. As the adhesive layer portion 3, there can be cited a resin film having adherence or an adhesive agent or the like. The adhesive layer portion 3 is not limited in particular as long as the adhesive layer portion 3 can fix the magnetic thin plates 2, 4. As concrete examples of the resin film, there can be cited a polyethylene terephthalate (PET) film, a polyester film, a polyimide (PI) film, a polyphenylene sulfide (PPS) film, a polypropylene (PP) film, a polytetrafluoroethylene (PTFE) film, and so on. As concrete examples of the adhesive agent, there can be cited an epoxy system adhesive agent, a silicone system adhesive agent, an acryl system adhesive agent, and so on.

As will be described later, when incision portions are provided in the magnetic thin plates 2, 4, it is preferable to provide the adhesive layer portion 3 between the respective magnetic thin plates since there is a possibility that a positional displacement of the incision portion occurs. A thickness of the adhesive layer portion 3 is preferable to be 100 μm or less, and further, is more preferable to be 50 μm or less. By making the adhesive layer portion 3 thin, an entire thickness of the magnetic sheet 1 can be made small. A lower limit value of the thickness of the adhesive layer portion 3 is not limited in particular, but is preferable to be 5 μm or more in order to make the adherence uniform. In a case of an electronic apparatus required to be made thinner such as a cellular phone, a thickness of the magnetic sheet 1, including a resin film covering an external appearance, is preferable to be 1 mm or less, is more preferable to be 0.8 mm or less, and further, is desirable to be 0.6 mm or less.

A laminate constituting the magnetic sheet 1 can have, as shown in FIG. 2, a plurality of first magnetic thin plates 2A, 2B and a plurality of second magnetic thin plates 4A, 4B. Further, as shown FIG. 3, a laminate can have a plurality of first magnetic thin plates 2A, 2B and one second magnetic thin plate 4. A laminate can have one first magnetic thin plate 2 and a plurality of second magnetic thin plates 4 in contrast to FIG. 3. The number of each of the magnetic thin plates 2, 4 is preferable to be in a range of one to four. The magnetic sheets 1 shown in FIG. 2 and FIG. 3 have structures in which the adhesive layer portions 3 are provided between the respective magnetic thin plates 2, 4.

The magnetic sheet 1 shown in FIG. 3 has a structure in which the laminate of two first magnetic thin plates 2A, 2B and one second magnetic thin plate 4 is covered by a resin film 5. If the magnetic thin plates 2, 4 are affected by corrosion such as rust, covering the entire laminate of the magnetic thin plates 2, 4 by the resin film 5 is effective. If it is necessary for the magnetic thin plates 2, 4 to be electrically insulated, the resin film 5 covering the entire laminate is effective. If the entire laminate is covered by the resin film 5 as in the magnetic sheet 1 shown in FIG. 3, it is not necessary to provide an adhesive layer portion 3 between the magnetic thin plates of the same kind, for example, between the magnetic thin plate 2A and the magnetic thin plate 2B. As concrete examples of the resin film 5, there can be cited a PET film, a PI film, a PPS film, a PP film, a PTFE film, and so on.

As a first concrete example of the magnetic sheet 1, there can be cited a laminate of a first magnetic thin plate 2 having a magnetostriction constant exceeding 5 ppm in an absolute value and a second magnetic thin plate 4 having a magnetostriction constant of 5 ppm or less in an absolute value. The magnetostriction constant can be measured by a strain gauge method. A range of the magnetostriction constant of 5 ppm or less in the absolute value indicates a range (including zero) from −5 ppm to +5 ppm. A range of the magnetostriction constant exceeding 5 ppm indicates a range of less than −5 ppm or exceeding +5 ppm. A magnetostriction indicates a rate of expansion or contraction of a magnetic substance in a magnetic field direction at a time that the magnetic substance is magnetized by an external magnetic field. When the magnetostriction of the magnetic substance is large, magnetic anisotropy is induced by an interaction between the magnetostriction and a stress, so that magnetic saturation is hard to occur.

The first magnetic thin plate 2 whose magnetostriction constant exceeds 5 ppm in the absolute value is hard to be magnetically influenced even in a case of being disposed in a power feeding device side. In other words, the first magnetic thin plate 2 whose magnetostriction constant exceeds 5 ppm in the absolute value is hard to be magnetic-saturated in a magnetic field brought by a magnet disposed in a power feeding device side, because of an interaction between a stress having been generated at a time of rolling in advance and the magnetostriction. Therefore, an L value (inductance value) necessary as the magnetic sheet 1 can be obtained. The second magnetic thin plate 4 whose magnetostriction constant is 5 ppm or less in the absolute value exhibits a high magnetic permeability when a magnet is not disposed in a power feeding device side. Therefore, according to the magnetic sheet 1 having the laminate of the first magnetic thin plate 2 and the second magnetic thin plate 4, a good magnetic shield effect can be obtained in either a non-contact charging method in which a magnet is disposed in a power feeding device side or a non-contact charging method in which a magnet is not disposed in a power feeding device side.

The difficulty of being magnetic-saturated based on the interaction between the magnetostriction and the stress can be obtained effectively when the absolute value of the magnetostriction constant exceeds 5 ppm. Therefore, the first magnetic thin plate 2 is preferable to have a magnetostriction constant exceeding 5 ppm in an absolute value. However, if the absolute value of the magnetostriction constant exceeds 50 ppm, there is a possibility that a magnetic anisotropy obtained by the interaction with the stress becomes too large to obtain a sufficient L value. Therefore, it is preferable that the absolute value of the magnetostriction constant of the first magnetic thin plate 2 is in a range exceeding 5 ppm to 50 ppm or less. The absolute value of the magnetostriction constant of the second magnetic thin plate 4 is preferable to be 5 ppm or less in order to obtain a high magnetic permeability, and further, is more preferable to be 2 ppm or less. The magnetostriction constant of the second magnetic thin plate 4 can be zero.

In the first concrete example of the magnetic sheet 1, the first magnetic thin plate 2 is preferable to have a thickness in a range of 50 to 300 μm. The second magnetic thin plate 4 is preferable to have a thickness in a range of 10 to 30 μm. Further, the first magnetic thin plate 2 is preferable to have an electric resistance value of 80 μΩ cm or more and a saturation magnetic flux density in a range of 1 T (10 kG) or more to 2.1 T (21 kG) or less. The second magnetic thin plate 4 is also preferable to have an electric resistance value of 80 μΩ cm or more. Constitutional conditions of the first and the second magnetic thin plates 2, 4 will be described in detail in a second concrete example.

As the second concrete example of the magnetic sheet 1, there can be cited a laminate of a first magnetic thin plate 2 having a thickness (plate thickness) in a range of 50 to 300 μm and a second magnetic thin plate 4 having a thickness (plate thickness) in a range of 10 to 30 μm. A magnetostriction constant of the first magnetic thin plate 2 is preferable to exceed 5 ppm in an absolute value. If the thickness of the first magnetic thin plate 2 is less than 50 μm, a stress generated by rolling becomes too large as will be described later, and a magnetic anisotropy obtained by an interaction with a magnetostriction becomes too large. Thus, there is a possibility that a sufficient L value cannot be obtained. The magnetostriction constant of the first magnetic thin plate 2 is preferable to be 50 ppm or less in an absolute value. If the thickness of the first magnetic thin plate 2 exceeds 300 μm, an L value and a Q value at 100 kHz or more are reduced. The thickness of the first magnetic thin plate 2 is preferable to be in a range of 80 to 250 μm. The thickness of the first magnetic thin plate 2 can be obtained by a later-described weighing method, or can be measured by a micrometer. When the thickness of the magnetic thin plate 2 is measured by the micrometer, the thickness is indicated by an average value of measured values of arbitrary three points.

The magnetic sheet 1 of the embodiment can be used as a magnetic shield for a non-contact power receiving device, regardless of existence/absence of a magnet in a power feeding device side. The magnetic sheet 1 has a structure in which the first magnetic thin plate 2 hard to be magnetic-saturated when a magnet is disposed in a power feeding device side and a second magnetic thin plate 4 exhibiting a high magnetic permeability at a used frequency when a magnet is not disposed are laminated. However, there is a case where an inductance of the second magnetic thin plate 4 is not materialized as it is despite the fact that a magnet is not disposed in a power feeding device side, so that only an inductance value reduced by about 15 to 30% is obtained as the magnetic sheet 1. The above is considered to be influenced by an electric resistance value of the first magnetic thin plate 2 hard to be magnetic-saturated. A cause thereof is not obvious, but is assumed to be as below.

If the electric resistance value of the first magnetic thin plate 2 is low, an eddy current loss becomes large, reducing a Q value. Concurrent therewith, the integrated second magnetic thin plate 4 made of a high magnetic permeability material is also influenced by the first magnetic thin plate 2, and it is considered that consequently an inductance value of the magnetic sheet 1 is reduced. Thus, the first magnetic thin plate 2 is preferable to have an electric resistance value of 80 μΩ cm or more. If the electric resistance value of the first magnetic thin plate 2 is 80 μΩ cm or more, increase of the eddy current loss or reduction of the Q value thereby can be suppressed. Therefore, it is possible to make the inductance of the second magnetic thin plate 4 exhibited effectively. The electric resistance value of the first magnetic thin plate 2 is preferable to be 100 μΩ cm or more. Further, the electric resistance value of the second magnetic thin plate 4 is also preferable to be 80 μΩ cm, and is more preferable to be 100 μΩ cm or more.

In order to suppress magnetic saturation of the first magnetic thin plate 2, it is preferable that the first magnetic thin plate 2 has a large magnetostriction constant and a saturation magnetic flux density of 1 T (10 kG) or more. By setting the saturation magnetic flux density of the first magnetic thin plate 2 to be 1 T or more, magnetic saturation of the first magnetic thin plate 2 can be suppressed more effectively when a magnet is disposed in a power feeding device side. In particular, when a magnet having a strong magnetic force, as a rare-earth magnet such as later-described Nd—Fe—B based magnet and Sm—Co based magnet, is used, the saturation magnetic flux density of the first magnetic thin plate 2 is preferable to be 1 T or more, and is further preferable to be 1.2 T or more. An upper limit of the saturation magnetic flux density of the first magnetic thin plate 2 is not limited in particular, but is preferable to be 2.1 T (21 kG) or less. Also in a case where the aforementioned rare-earth magnet is used, it is sufficient that the saturation magnetic flux density is about 2.1 T. Further, there is another reason that rust becomes easy to be generated during usage, if the saturation magnetic flux density exceeds 2.1 T, since an additive element amount in an Fe alloy is limited significantly and a measure to resist oxidation becomes insufficient.

It is preferable that the laminate constituting the magnetic sheet 1 has one first magnetic thin plate 2 or first magnetic thin plates 2 laminated in a range of two to four plates. In order to make magnetic saturation hard to occur in a case where a magnet is disposed in a power feeding device side, it is effective to make the number of the first magnetic thin plates 2 to be laminated large. However, when the number of the plates to be laminated is increased, an entire thickness of the magnetic sheet 1 becomes large. If the thickness of the entire magnetic sheet 1 becomes too large, it becomes difficult to mount the magnetic sheet 1 on an electronic apparatus which is demanded to be made thinner, such as a cellular phone. As a result that the first magnetic thin plate 2 having a thickness of 50 to 300 μm satisfies two or more conditions of the magnetostriction constant exceeding 5 ppm in the absolute value, the electric resistance value of 80 μΩ cm or more, and the saturation magnetic flux density of 1 T or more, it becomes possible to decrease the number of the first magnetic thin plates 2 to one to four, and further, to one to three.

It is preferable that the second magnetic thin plate 4 has the thickness in the range of 10 to 30 μm as described above. As a result of the thickness of the second magnetic thin plate 4 being 30 μm or less, the second magnetic thin plate 4 can have a higher magnetic permeability. However, if the thickness of the second magnetic thin plate 4 is less than 10 μm, manufacturing becomes difficult, and further, there is a possibility that the second magnetic thin plate 4 is broken at a time of formation of a later-described incision portion. The thickness of the second magnetic thin plate 4 is preferable to be in a range of 12 to 25 μm. The second magnetic thin plate 4 is preferable to exhibit a high magnetic permeability at a used frequency of a power receiving device. The used frequency of the power receiving device means a frequency used in transmission for non-contact charging. The magnetic permeability of the second magnetic thin plate 4 is preferable to be 1000 or more at a used frequency. The magnetostriction constant of the second magnetic thin plate 4 is preferable to be 5 ppm or less in an absolute value. Based on the thickness and the magnetostriction constant of the second magnetic thin plate 4, the magnetic permeability of the second magnetic thin plate 4 can be heightened more effectively.

A thickness (plate thickness) X of the second magnetic thin plate 4 is preferable to be obtained by a weighing method. Concretely, a density (actual measured value) D of the second magnetic thin plate 4 is obtained by an Archimedes method. Next, a length L and a width W of the second magnetic thin pate 4 are measured by a caliper or the like. Further, a mass M of the second magnetic thin plate 4 is measured. The density D of the second magnetic thin plate 4 is equal to mass M/volume (length L×width W×thickness X). Therefore, the plate thickness X of the second magnetic thin plate can be obtained from [mass M/(length L×width W)]/density D. The second magnetic thin plate 4 is sometimes manufactured by using a quenching method, as a later-described amorphous alloy thin band. In such a case, an undulation is sometimes formed in a surface of the alloy thin band depending on a surface state of a chill roll. Thus, when an amorphous alloy or an Fe-based microcrystalline alloy is used as the second magnetic thin plate 4, it is preferable to obtain a thickness by a weighing method.

It is preferable that the laminate constituting the magnetic sheet 1 has one second magnetic thin plate 4 or second magnetic thin plates 4 laminated in a range of two to four plates. In order to obtain a high magnetic permeability in a case where a magnet is not disposed in a power feeding device side, it is effective to make the number of the second magnetic thin plates 4 to be laminated large. However, when the number of the plates to be laminated is increased, the entire thickness of the magnetic sheet 1 becomes large. If the entire thickness of the magnetic sheet 1 becomes too large, it becomes difficult to mount the magnetic sheet 1 on an electronic apparatus which is demanded to be made thinner, such as a cellular phone. As a result that the second magnetic thin plate 4 having a thickness of 10 to 30 μm satisfies one or two condition(s) of the magnetostriction constant of 5 ppm or less in an absolute value and a composing material of the magnetic thin plate 4 having a composition represented by a later-described general formula 1 or general formula 2, it becomes possible to decrease the number of the second magnetic thin plates 4 to one to four, and further, to one to three.

The composing material of the first magnetic thin plate 2 is not limited in particular as long as the composing material satisfies the above-described characteristic, but it is preferable to apply an alloy based on Fe or Ni. Note that "based" means being contained most as an constituent element in view of a mass ratio. As the composing material of the first magnetic thin plates 2, there can be cited an Fe alloy of an Fe—Cr system, an Fe—Ni system, an Fe—Si system, or the like. As concrete examples of the Fe alloy, there can be cited a stainless steel, a silicon steel, a permalloy, an Invar, a Kovar, and so on. The first magnetic thin plate 2 is preferable to be made of the stainless steel among the above, of a ferrite system stainless steel in particular. The Fe alloy of the Fe—Cr system, the Fe—Ni system, and the Fe—Si system is easy to be adjusted in plate thickness by rolling. Further, it is easy to form an inner strain in a stressing process step such as rolling and to generate a magnetic anisotropy by an interaction with a magnetostriction. Therefore, it is possible to make the first magnetic thin plate 2 hard to be magnetic-saturated.

The ferrite system stainless steel is one kind of the Fe—Cr system alloy, and is preferable to contain Cr in a range of 10 to 28 mass %. If a content of the Cr is 10 mass % or less, an electric resistance is low, and if the content of Cr exceeds 28 mass %, a workability is reduced, so that a thin plate is hard to be obtained and saturation magnetization is reduced. The content of Cr is more preferable to be in a range of 12 to 26 mass %, and further, being in a range of 15 to 25 mass % is desirable. The ferrite system stainless steel can contain, other than Fe and Cr, 0.1 mass % or less of C (carbon), 0.1 mass % or less of N (nitride), 0.1 mass % or less of 0 (oxygen), 0.1 mass % or less of P (phosphor), 0.1 mass % or less of S (sulfur), and so on.

The ferrite system stainless steel can contain 5 mass % or less of Ni, 5 mass % or less of Co, 5 mass % or less of Cu, 3 mass % or less of Si, 0.1 to 8 mass % of Al, 0.3 mass % or less of B, and 1 mass % or less of Mn. Further, the ferrite system stainless steel can contain at least one kind selected from Ti, Zr, Hf, V, Nb, Ta, Mo, and W in a range of 1 mass % or less, at least one kind selected from Be, Mg, Ca, Sr, and Ba in a range of 0.1 mass % or less, at least one kind selected from Zn, Ga, In, Ge, Sn, Pb, Sb, Bi, Se, and Te in a range of 1 mass % or less, and at least one kind selected from rare-earth elements including Y in a range of 1 mass % or less. A lower limit value of each component includes zero (detection limit or less) if not otherwise mentioned.

The reason for limiting each additive element in the ferrite system stainless steel is as below. If the content of C is large, a hot workability is reduced, and the content of C is preferable to be small. However, substantial reduction is difficult in view of manufacturability. The content of C is preferable to be 0.1 mass % or less in view of workability and toughness. Reducing the content of N substantially is difficult in view of manufacturability. The content of N is preferable to be 0.1 mass % or less in view of workability and toughness. P is effective for increasing an electric resistance value, and has an effect of improving a high frequency characteristic. However, if P is contained much, a hot workability is reduced, and thus the content of P is preferable to be 0.1 mass % or less. If the content of S exceeds 0.1 mass %, a sulfide or an oxide is apt to be formed in a crystal grain boundary, and a hot workability is reduced. Further, an etching performance is also reduced. The content of S is preferable to be 1 mass % or less. If the content of O is large, oxide system inclusions increase and a workability is reduced. The content of O is preferable to be 0.1 mass % or less and is more preferable to be 0.01 mass % or less.

Ni, Co, and Cu contribute to improvement of a corrosion resistance, improvement of a high frequency characteristic by micronization of a crystal grain, and improvement of a workability. However, if the contents of the above elements are too large, an effect of addition thereof is reduced, and thus the content of each element is preferable to be 5 mass % or less, and is more preferable to be 4 mass % or less. Si is an element effective for control of a soft magnetic characteristic, and has an effect as a deoxidizer and an effect of improving a hot workability. If the content of Si is too large, a workability is deteriorated on the contrary, and thus the content of Si is preferable to be 3 mass % or less, and further, is more preferable to be 2.5 mass % or less. Al is an element effective for heightening an electric resistance. When the content of Al is 0.1 mass % or more, the electric resistance increases effectively, but if the content of Al exceeds 8 mass %, a workability is reduced. B has an effect of suppressing segregation of C, S, P, O, N or the like to a grain boundary and an effect of improving a hot workability. If the content of B is too large, a boride containing C, O, N is formed and the workability is deteriorated. The content of B is preferable to be 0.3 mass % or less, and further, is more preferable to be 0.1 mass % or less. Mn is effective as a deoxidizer. If the content of Mn is too large, a hot workability is reduced, and the content of Mn is preferable to be 1 mass % or less and is more preferable to be 0.8 mass % or less.

Since at least one kind of element selected from Ti, Zr, Hf, V, Nb, Ta, Mo, and W is effective for heightening a strength and improving a corrosion resistance, a workability such as pressing is improved and an electric resistance value becomes high. If a total content of those elements exceeds 1 mass %, a toughness is reduced. Preferable elements are Ti, Nb, and Ta. At least one kind of element selected from Be, Mg, Ca, Sr, and Ba has an effect as a deoxidizer and an effect of improving a hot workability. If a total content of those elements exceeds 0.1 mass %, the workability is deteriorated on the contrary. The more preferable content is 0.03 mass % or less. At least one kind of element selected from Zn, Ga, In, Ge, Sn, Pb, Sb, Bi, Se, and Te is an element effective for improvement of a workability, but if a total content exceeds 1 mass %, it becomes hard to be processed. The more preferable content is 0.3 mass % or less. At least one kind of element selected from rare-earth elements including Y is effective for heightening an electric resistance and has an improvement effect for a hot workability. If a total content of the above elements exceeds 1 mass %, the workability is deteriorated on the contrary. The more preferable content is 0.5 mass % or less.

Also in the Fe—Ni system alloy and the Fe—Si system alloy, an electric resistance is less than 80 μΩ cm with only the main constituent elements, but the electric resistance value becomes 80 μΩ cm or more with addition of an optimum dose of Al, addition of Ti, Zr, Hf, V, Nb, Ta, Mo, W, B, rare-earth elements, alkaline earth elements, and by control of a remaining amount of an oxidizer such as Mn, similarly to in the Fe—Cr system alloy. However, in the Fe—Ni system, with a composition of an Ni amount in a neighborhood of 78 to 80 mass % and in the Fe—Si system with a composition of an Si amount in a neighborhood of 6.5 mass %, a magnetostriction constant becomes small and an inductance value is reduced when a magnet is disposed in a power feeding device side. It is preferable to exclude such a composition.

The Fe alloy thin plate constituting the first magnetic thin plate 2, such as of an Fe—Cr system, an Fe—Ni system, and an Fe—Si system is fabricated by respective processes of general melting, casting, and rolling. For example, after alloy raw materials adjusted to have a predetermined composition ratio are melted in an atmosphere or an inert atmosphere, the alloy raw materials are cast into a predetermined mold. Next, the alloy material is hot-worked or cold-worked, and rolled to have an object plate thickness, and thereby a magnetic thin plate is obtained. It is possible to directly quench-roll the alloy in a melted state, using a twin-roll method, and thereby to obtain a magnetic thin plate. It is possible to perform a heat treatment after rolling for the sake of a higher magnetic permeability. A condition of the heat treatment is preferable to be 600 to 1200° C. and 10 seconds to 5 hours. When a Co-based amorphous alloy or an Fe-based microcrystalline alloy is used as the second magnetic thin plate 4, the first magnetic thin plate 2 is not necessarily required to have a higher magnetic permeability, and thus a plate material subjected to a heat treatment of a temperature less than 600° C. or a plate as it is after rolling can be applied to a magnetic sheet 1. Therefore, a manufacturing cost of the magnetic sheet 1 can be reduced.

The second magnetic thin plate 4 is preferable to be made of the Co-based amorphous alloy or the Fe-based microcrystalline alloy having an average crystal grain diameter of 5 to 30 nm. A thin plate made of such an alloy can be fabricated by rapidly quenching an alloy liquid by a single-roll method, for example. Therefore, it is possible to obtain a magnetic thin plate 4 with a thickness in a range of 10 to 30 μm easily.

The Co-based amorphous alloy is preferable to have a composition represented by a general formula 1 below.

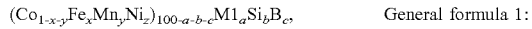

General formula 1: $(Co_{1-x-y}Fe_xMn_yNi_z)_{100-a-b-c}M1_aSi_bB_c$, where, M1 is at least one element selected from Ti, Zr, Hf, V, Nb, Ta, Cr, Mo, and W, x, is $0 \leq x \leq 0.1$ (atomic ratio), y is $0 \leq y \leq 0.1$ (atomic ratio), z is $0 \leq z \leq 0.1$ (atomic ratio), a is $0 \leq a \leq 10$ at %, b is $5 \leq b \leq 20$ at %, and c is $5 \leq c \leq 30$ at %.

In the general formula 1, contents of Co, Fe, Mn, and Ni are adjusted in composition ratio in correspondence with a required magnetic characteristic such as a magnetic permeability, a magnetostriction constant, a magnetic flux density, and an iron loss. The element M1 is an element added as necessary for controlling a heat stability, a corrosion resistance, and a crystallization temperature. Si (silicon) and B (boron) are elements effective for amorphousing a magnetic alloy. In particular, B is effective for amorphousing the magnetic thin plate 4. Si is an element which assists formation of an amorphous phase and is effective for rise of a crystallization temperature. The Co-based amorphous alloy satisfying the general formula 1 is easy to be adjusted to have a magnetostriction constant of 5 ppm or less in an absolute value, and further, 2 ppm or less (including zero). In order to adjust a magnetic characteristic of the Co-based amorphous alloy, a heat treatment can be carried out at 300 to 500° C. for 5 minutes to 2 hours.

The Fe-based microcrystalline alloy is preferable to have a composition represented by a general formula 2 below.

General formula 2: $(Fe_{1-d}T_d)_{100-e-f-g-h}Cu_eSi_fB_gM2_h$, where, T is at least one element selected from Co and Ni, M2 is at least one element selected from Ti, Zr, Hf, V, Nb, Ta, Mo, and W, d, is $0 \leq d \leq 0.5$ (atomic ratio), e is $0 \leq e \leq 3$ at %, f is $0 \leq f \leq 30$ at %, g is $2 \leq g \leq 25$ at %, and h is $0.1 \leq h \leq 30$ at %. A composition ratio of the elements Fe and T is adjusted in correspondence with a required magnetic characteristic such as a magnetic permeability, a magnetostriction constant, a magnetic flux density, and an iron loss. Cu is a component preventing coarsening of a crystal at a time of precipitating the crystal. The element M2 is an element effective for uniformizing crystal grain diameters and reducing a magnetostriction. Si and B are components effective for amorphousing once. The Fe-based microcrystalline alloy, similarly to the amorphous alloy, is made by fabricating an amorphous thin plate of a thickness of 10 to 30 μm by a quenching method and heat-treating this amorphous thin plate at a temperature of 500 to 700° C. for 5 minutes to 5 hours. A fine crystal with an average crystal grain diameter of 5 to 30 nm is precipitated by the heat treatment. It suffices that precipitation of the fine crystal is 20% or more in an area ratio.

The magnetic sheet 1 of the embodiment is fabricated by processing the magnetic thin plates 2, 4 into predetermined sizes and thereafter laminating the magnetic thin plates 2, 4 via the adhesive layer portion 3 as necessary. If an L value of the magnetic sheet 1 is given greater importance, it is preferable to form the magnetic sheet 1 without performing further processing to the second magnetic thin plate 4. In order to improve a Q value of the magnetic sheet 1, it is effective to form an incision portion in the second magnetic thin plate 4. The first magnetic thin plate 2 is preferable to have an incision portion. The incision portion here means a slit penetrating from front to back of one magnetic thin plate. The laminate constituting the magnetic sheet 1 is preferable to have one or more magnetic thin plate(s) 2, 4 provided with the incision portion(s) with a width of 1 mm or less (including zero). Further, the laminate is more preferable to have one or more first magnetic thin plate(s) 2 having the incision portion(s).

Figure 4:
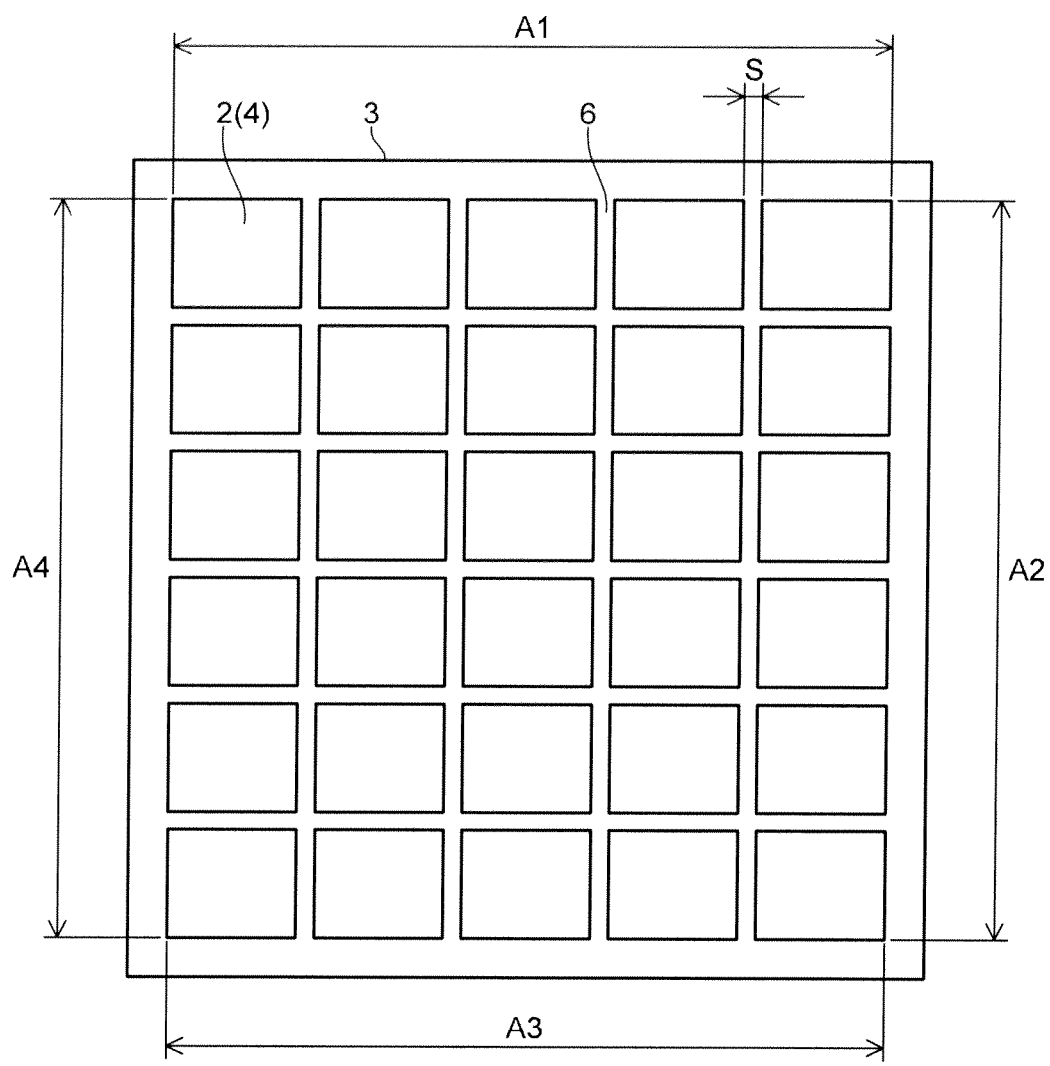
FIG. 4 is a plan view showing a first example of an incision portion of a magnetic thin plate in the magnetic sheet of the embodiment and a measurement example of an outer periphery length A of the magnetic thin plate.
Figure 5:
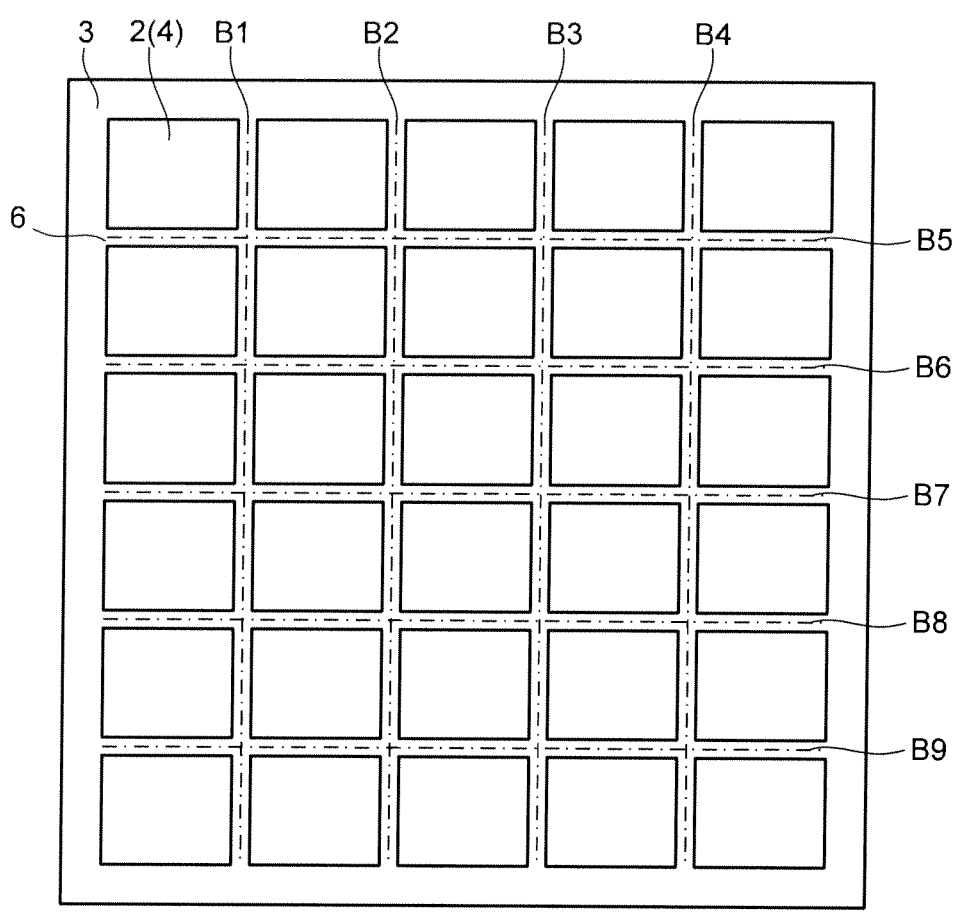
FIG. 5 is a plan view showing a measurement example of a total length B of the incision portion of the magnetic thin plate in the magnetic sheet of the embodiment.
Figure 6:
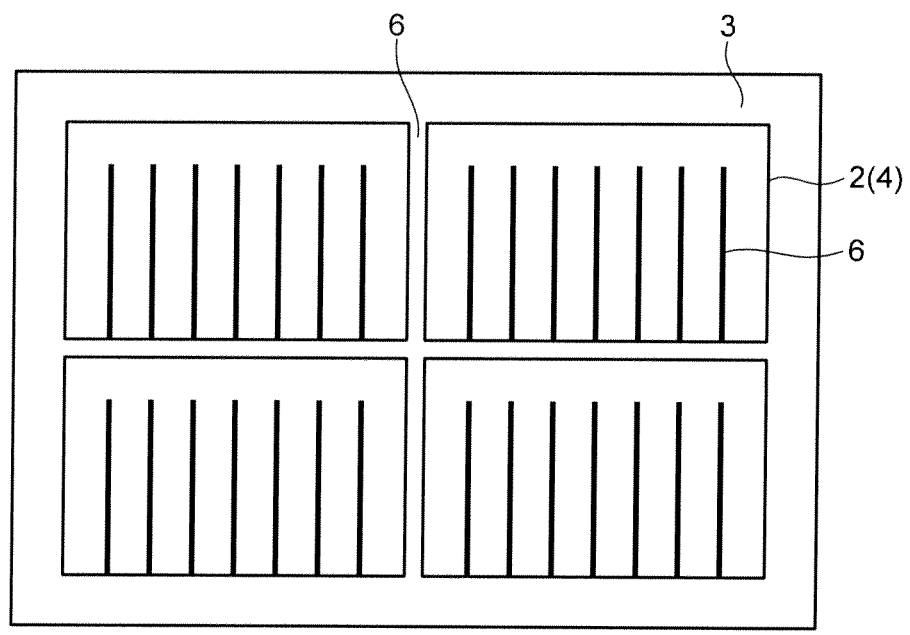
FIG. 6 is a plan view showing a second example of the incision portion of the magnetic thin plate in the magnetic sheet of the embodiment.
Figure 7:
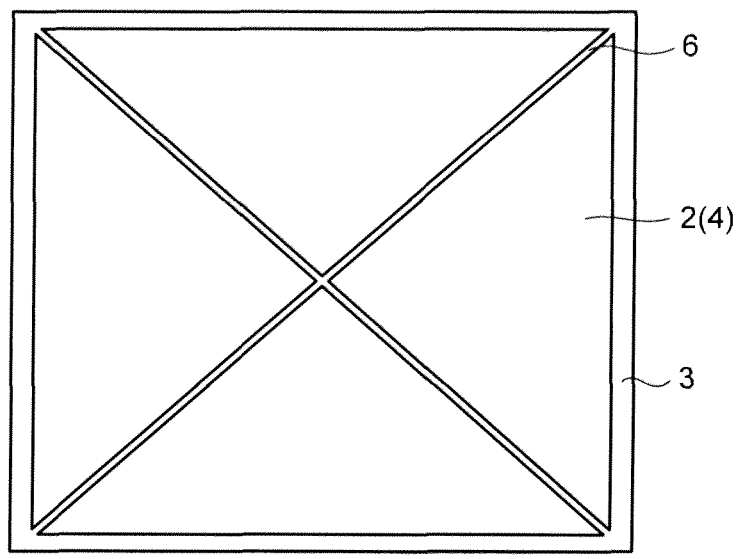
FIG. 7 is a plan view showing a third example of the incision portion of the magnetic thin plate in the magnetic sheet of the embodiment.
Figure 8:
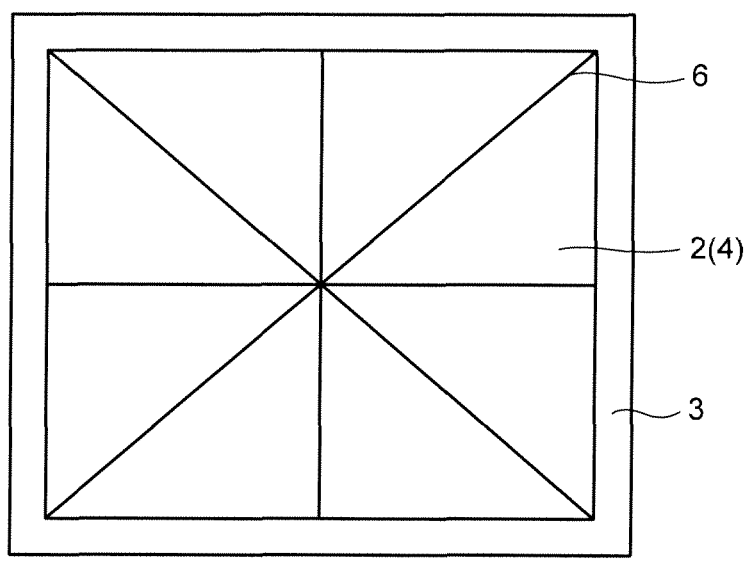
FIG. 8 is a plan view showing a fourth example of the incision portion of the magnetic thin plate in the magnetic sheet of the embodiment.
Figure 9:
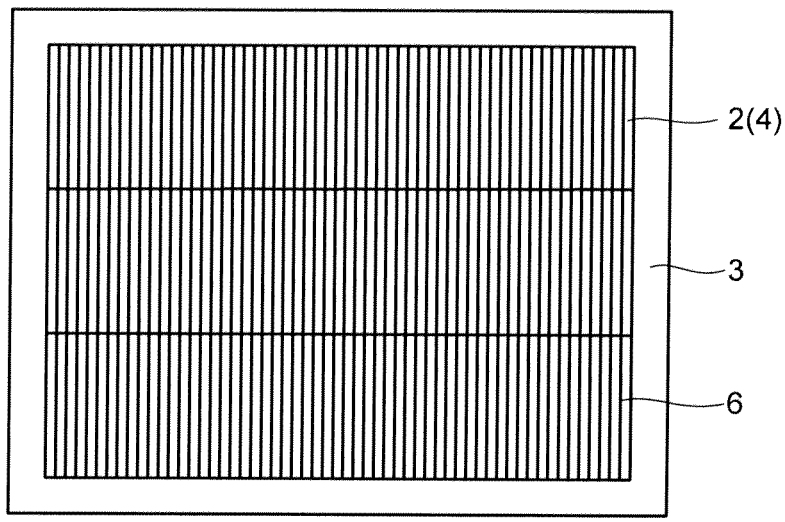
FIG. 9 is a plan view showing a fifth example of the incision portion of the magnetic thin plate in the magnetic sheet of the embodiment.

FIG. 4 to FIG. 9 show examples of formation of the incision portions. In those drawings, since the incision portion can be formed in either the first magnetic thin plate 2 or the second magnetic thin plate 4, reference numerals of the magnetic thin plate are "2 (4)". FIG. 4 and FIG. 5 show examples in which lattice-shaped incision portions 6 are formed uniformly in entire magnetic thin plates 2 (4). FIG. 6 is an example in which four magnetic thin plates 2 (4) in which incision portions 6 are provided are disposed on an adhesive layer portion 3. FIG. 7 indicates an example of a magnetic thin plate 2 (4) in which incision portions 6 are provided diagonally on the magnetic thin plate 2 (4) and segmenting into four. FIG. 8 indicates an example in which a magnetic thin plate 2 (4) is provided with incision portions 6 to segment a magnetic thin plate 2 (4) into eight. FIG. 9 indicates an example in which a magnetic thin plate 2 (4) is provided with numeral linear slits (incision portions 6). A shape of the incision portion 6 is not limited to a straight line, but can be s curved shape, a cross shape, a zigzag shape, or the like.

A method for forming the incision portion 6 is not limited in particular, and there can be cited, for example, a method in which a continuous magnetic thin plate is cut into an object size by a cutting blade, a method in which slits are formed by etching, a method in which slits are formed by laser processing, and so on. The incision portion 6 can be formed by combining these methods. It is possible to form the incision portion 6 after the magnetic thin plate 2 (4) is disposed on an adhesive layer portion 3, and it is also possible to dispose the magnetic thin plate 2 in which the incision portion 6 is formed in advance on an adhesive layer portion 3. It is possible to form the incision portions 6 uniformly on the entire magnetic thin plate 2 (4), and for example, it is possible to form in a sparse and dense state where the incision portions 6 are dense in a neighborhood of a center of the magnetic thin plate 2 (4). The shapes of the incision portions 6 formed in the individual magnetic thin plates 2 (4) in a laminate can be different from each other.

The magnetic sheet 1 of the embodiment is preferable to have at least one magnetic thin plate 2 (4) in which a ratio (B/A) of a total length B of the incision portions 6 provided in the magnetic thin plate 2 (4) in relation to a total outer peripheral length A of outer peripheral regions of the magnetic thin plates 2 (4) disposed on the same plane is in a range of 2 to 25. By controlling the B/A ratio of the incision portion 6 provided in the magnetic thin plate 2 (4) in the range of 2 to 25, the L value and the Q value of the magnetic sheet 1 can be improved. When the B/A ratio is less than 2, an improvement effect of the Q value is not sufficient, and when the B/A ratio exceeds 25, the L value is reduced. In other words, when the B/A ratio is less than 2, an effect of suppressing generation of an eddy current is small, and when the B/A ratio exceeds 25, a power receiving efficiency is reduced. Reduction of the power receiving efficiency causes elongation of a charging time.

In a non-contact charger, a resonance circuit is applied to a power receiving device (electronic apparatus to be charged) in order to heighten a power receiving efficiency. In the resonance circuit, which is constituted by connecting L (inductor) and C (condenser) in series or in parallel, a current flowing in the circuit at a specific resonance frequency becomes maximum or minimum. An important characteristic to obtain radicalization (selectivity of frequency) of the resonance circuit is a Q value of resonance. The Q value is represented by $Q=2\pi fL/R$. A symbol $\pi$ indicates a circle ratio 3.14, a symbol f indicates a frequency, a symbol L indicates an L value (inductance), and a symbol R indicates a loss. In order to raise the Q value, the frequency f is made large, L is made large, or the loss R is made small. Though the frequency f can be made large by circuit design, the larger frequency f leads to a larger eddy current, so that the loss R becomes large.

Thus, in this embodiment, increase of an eddy current loss is prevented by using the magnetic thin plate 2 (4) in which a predetermined amount (B/A is 2 to 25) of incision portions 6 are formed. An eddy current is a circular current excited in a conductor by electromagnetic induction when largeness of a magnetic filed applied to the conductor changes, and a loss generated by the above is the eddy current loss. Because of electromagnetic induction, when the eddy current becomes large, heat generation occurs. For example, in a power receiving device on which a secondary battery is mounted, a casing of the secondary battery generates heat due to the eddy current, leading to a shorter charge/discharge cycle life time and acceleration of deterioration of a discharge capacity. Heat generation more than necessary causes breakdown of an electronic device. By forming the incision portion 6 in the magnetic thin plates 2 (4), increase of the eddy current loss is suppressed. By making a width S of the incision portion 6 be as small as 1 mm or less (including zero), it is possible to prevent a magnetic flux from passing through a space of the magnetic thin plate 2 (4) and the eddy current from being generated in a surface or the like of the casing of the secondary battery.

The total outer periphery length A of the outer periphery regions of the magnetic thin plate 2 (4) means an outermost periphery length of the magnetic thin plate (regardless of a case of being segmented and a case of not being segmented) disposed in one surface of the magnetic sheet 1. The total outer periphery length A of the outer periphery regions of the magnetic thin plate 2 (4) is obtained from "A1+A2+A3+A4" as shown in FIG. 4. FIG. 4 shows the example in which the magnetic thin plates 2 (4) are disposed in a square shape, but a length of an outer periphery is an outer periphery length A also in a case of another shape. Since the incision portion 6 being a space between the magnetic thin plates 2 (4) is as small as 1 mm or less in width, the total outer periphery length A of the outer periphery regions of the magnetic thin plates 2 (4) is obtained by the above-described obtaining method.

FIG. 5 shows how to obtain the total length 13 of the incision portions 6 provided in the magnetic thin plate 2 (4). When all the widths of the incision portion 6 shown in FIG. 5 are 1 mm or less, the total length B of the incision portions 6 is obtained from "B1+B2+B3+B4+B5+B6+B7+B8+B9". If the widths of B1 to B8 are 0.5 mm and the width of B9 is 2 mm, the total length B of the incision portions 6 is "B1+B2+B3+B4+B5+B6+B7+B8". As shown in FIG. 6, if the incision portion 6 of a space type which separates between the magnetic thin plates 2 (4) and the incision portion 6 of a slit shape formed in the magnetic thin plate 2 (4) itself are had, a total length of the incision portions 6 whose widths S are 1 mm or less among the space and the slit is B. The slit penetrates from front to back.

Though FIG. 4 and FIG. 5 show states where spaces are provided between the magnetic thin plates 2 (4) for the sake of easy understanding, the adjacent magnetic thin plates 2 (4) can be disposed in contact with each other (width S of the incision portion 6=0 mm). All the widths S of the incision portions 6 are preferable to be 1 mm or less (including zero). If the width S of the incision portion 6 is too large, an area of the magnetic thin plate 2 (4) in a predetermined size of the magnetic sheet 1 is decreased, and a magnetic shield effect by the magnetic sheet 1 is reduced. The width S of the incision portion 6 is preferable to be 0.5 mm or less. In a case where the width S of the incision portion 6 exceeding 1 mm exists, with a total area of the incision portions 6 being 100%, such an incision portion 6 is preferable to be 10% or less of the whole.

The laminate constituting the magnetic sheet 1 is preferable to have two or more magnetic thin plates 2 (4) having incision portions 6 with different B/A ratios. For example, it is preferable that the B/A ratio of the incision portion 6 of the first magnetic thin plate 2 is different from the B/A ratio (including zero) of the incision portion 6 of the second magnetic thin plate 4. The magnetic sheet 1 of the embodiment uses the first and the second magnetic thin plates 2, 4 with different kinds. Since the magnetic characteristics required for the first and the second magnetic thin plates 2, 4 are different, B/A ratios are preferable to be set in correspondence with the respective magnetic thin plates 2, 4. Further, by differentiating the B/A ratios, a continuous hole is prevented from being provided in a thickness direction of the magnetic sheet 1, so that the effect of suppressing generation of the eddy current is improved. If a high inductance value is necessary, the B/A ratio of the second magnetic thin pate 4 can be zero, that is, the second magnetic thin plate 4 is not required to have the incision portion 6.

In a case where the second magnetic thin plate 4 having been subjected to a heat treatment is bend-processed in a manner to be sandwiched by an adhesive film or the like and an incision portion 6 is formed, embrittlement of the second magnetic thin plate 4 proceeding, there is a possibility that fine cracks occur in a neighborhood of a segmenting line by the number more than an object number of segments. In such a case, a crack with a width of 1 mm or less is counted as one incision portion 6. In other words, in a segmenting process step in which the incision portion 6 is formed, there is sometimes generated a powdery part as a result that the magnetic thin plate is ground in a neighborhood of a segmenting line at a time of segmenting, but when the ground powdery part is in the incision portion of the width of 1 mm or less, such a portion is counted as one incision portion.

Figure 10:
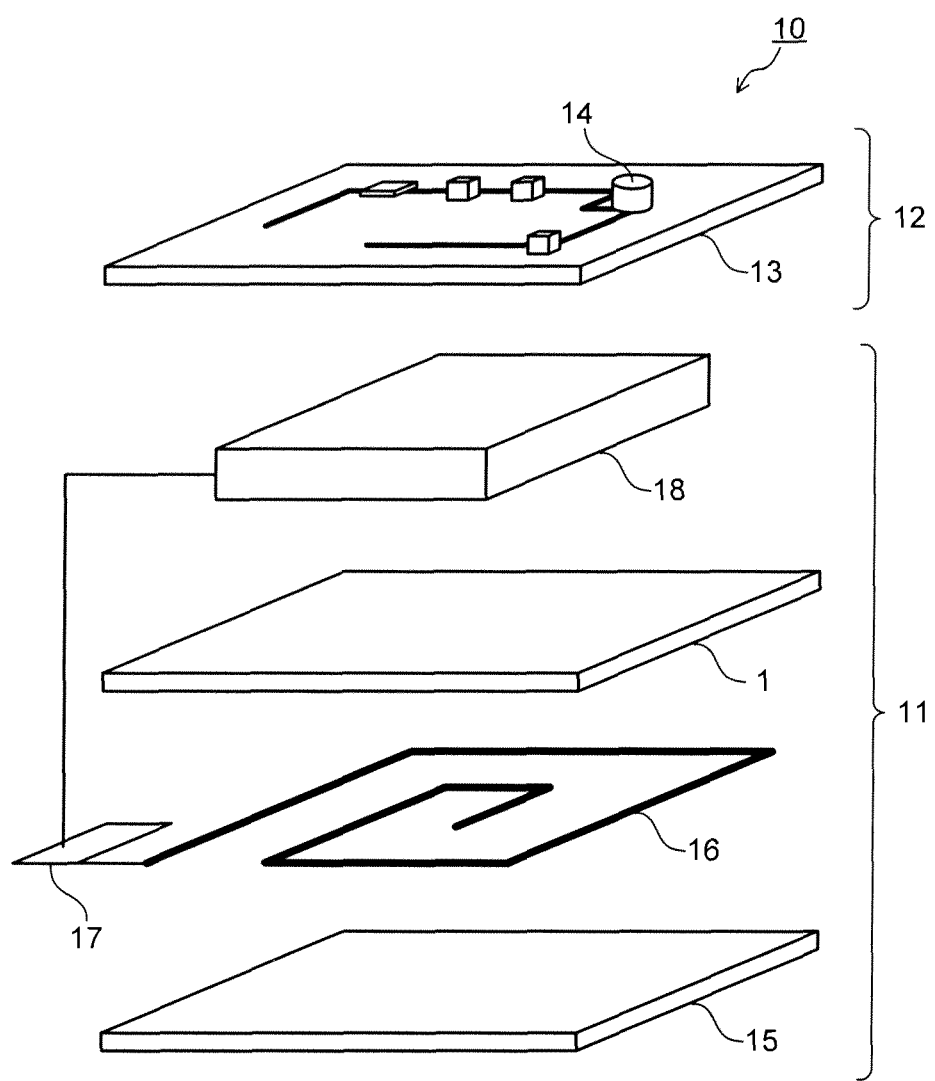
FIG. 10 is a view showing a schematic configuration of an electronic apparatus according to the first embodiment.
Figure 11:
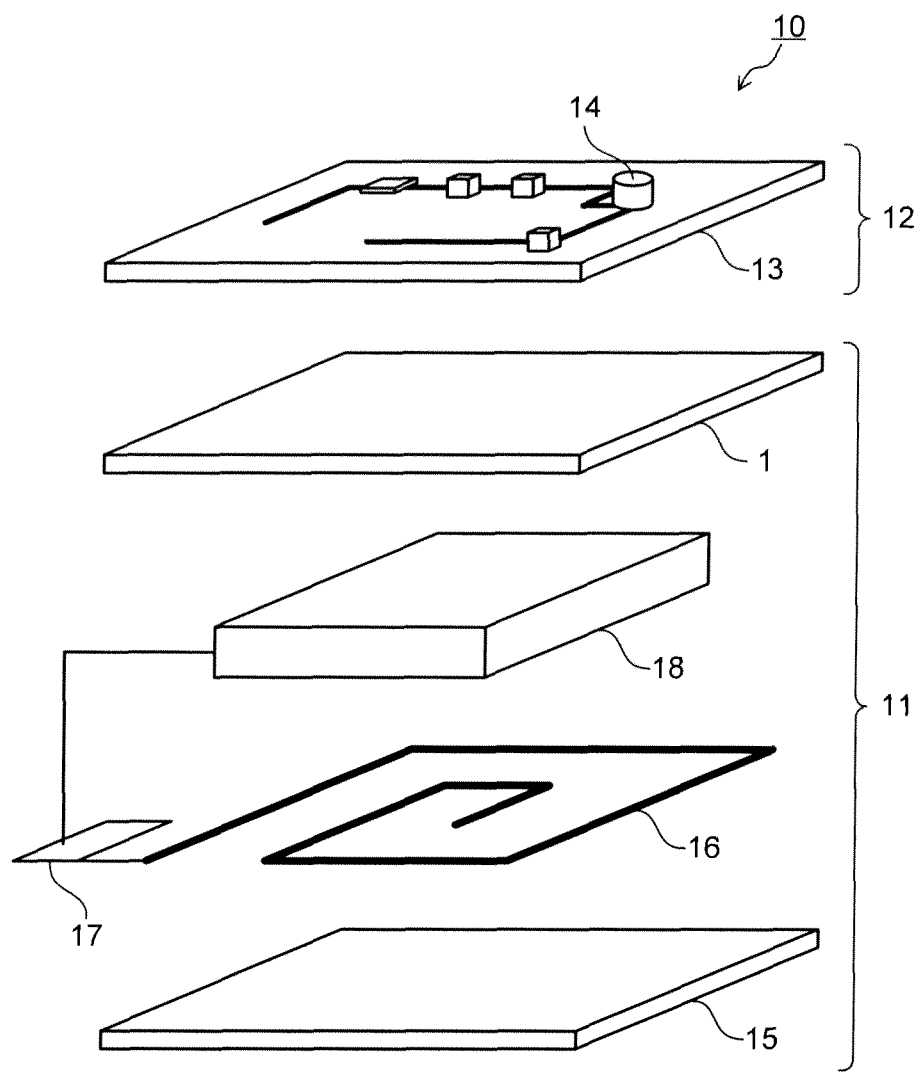
FIG. 11 is a view showing a schematic configuration of an electronic apparatus according to the second embodiment.

Next, a power receiving device, an electronic apparatus, and a non-contact charger of the embodiment will be described. FIG. 10 and FIG. 11 show configurations of the electronic apparatuses according to first and second embodiments. An electronic apparatus 10 shown in FIG. 10 and FIG. 11 has a power receiving device 11 to which a non-contact charging method is applied, and an electronic apparatus main body 12. The electronic apparatus main body 12 has a circuit substrate 13 and an electronic device 14 mounted thereon. The power receiving device 11 and the electronic apparatus main body 12 are disposed in a housing 15. These elements constitute the electronic apparatus 10.

The power receiving device 11 has a spiral coil 16 as a power receiving coil, a rectifier 17 rectifying an alternating voltage generated in the spiral coil 16, and a secondary battery 18 to which a direct-current voltage rectified by the rectifier 17 is charged. The electronic apparatus main body 12 has the electronic device 14 which operates when the direct-current voltage charged to the secondary battery 18 of the power receiving device 11 is supplied. The electronic apparatus main body 12 can have a component, a device or the like other than the electronic device 14 and the circuit substrate 13. A the spiral coil 16, there is used a flat coil made by winding a metal wire such as a copper wire in a flat state, a flat coil formed by printing a metal powder paste in spiral, or the like. A winding shape of the spiral coil 16, such as a circle, an ellipse, a square, and a polygon, is not limited in particular. A winding number of the spiral coil 16 is also set appropriately in correspondence with a required characteristic.

As the rectifier 17, there can be cited a semiconductor element such as a transistor and a diode. The number of the rectifiers 17 is arbitrary, and one, or two or more rectifier(s) 17 is (are) used as necessary. The rectifier 17 can be one formed by a film-forming technique such as TFT. In FIG. 10 and FIG. 11, the rectifier 17 is disposed in a power receiving coil 16 side of the circuit substrate 13. The rectifier 17 can be provided in a surface of a side opposite to the power receiving coil of the circuit substrate 13. The secondary battery 18 is capable of charging/discharging, and ones in various shapes such as a flat plate type and a button type can be used. The electronic device 14 includes various elements and components constituting the circuit, such as a resistance element, a capacitor element, an inductance element, a control element, and a storage element. Further, a component or a device other than the above can be included. The circuit substrate 13 is made by forming a circuit in a surface of or inside an insulating substrate such as a resin substrate and a ceramics substrate. The electronic device 14 is mounted on the circuit substrate 13. The electronic device 14 can include what is not mounted on the circuit substrate 13.

The electronic apparatus 10 of the first embodiment has, as shown in FIG. 10, a magnetic sheet 1 provided between the spiral coil (power receiving coil) 16 and the secondary battery 18. In other words, the spiral coil 16 and the secondary battery 18 are disposed sandwiching the magnetic sheet 1. The spiral coil 16 has a plane portion as at least a part thereof, and this plane portion is disposed along a surface of the magnetic sheet 1. When viewed as the power receiving device 11, between the spiral coil 16 and the secondary battery 18 which constitute the power receiving device 11 is disposed the magnetic sheet 1.

An electronic apparatus 10 of the second embodiment has, as shown in FIG. 11, a magnetic sheet 1 disposed between the secondary battery 18 and the circuit substrate 13. Further, the magnetic sheet 1 can be disposed between the spiral coil 16 and the rectifier 17 or between the spiral coil 16 and the electronic device 14. The magnetic sheet 1 is disposed in one place or more of the respective places above. The magnetic sheet 1 can be disposed in two or more places.

A configuration of the electronic apparatus 10 is not limited to that of FIG. 10 or FIG. 11. Disposition of the spiral coil 16, the secondary battery 18, and the circuit substrate 13 can be changed in various ways. For example, a secondary battery, a circuit substrate, and a spiral coil can be disposed in sequence from an upper side. The magnetic sheet 1 is disposed between the circuit substrate 13 and the spiral coil 16, for example. When the magnetic sheet 1 is disposed between the spiral coil 16 and the circuit substrate 13, it suffices that the spiral coil 16, the magnetic sheet 1, and the circuit substrate 13 are simply laminated or that an adhesive agent or a brazing material is used to fix the above. The same applies to a case of a structure other than the above, and it suffices that each component is simply laminated or that an adhesive agent or a brazing material is used to fix the components.

As described above, as a result that the magnetic sheet 1 is disposed at least one of between the spiral coil 16 and the secondary battery 18, between the spiral coil 16 and the rectifier 17, between the spiral coil 16 and the electronic device 14, and between the spiral coil 16 and the circuit substrate 13, a magnetic flux passing through the spiral coil 16 at a time of charging can be shielded by the magnetic sheet 1. Therefore, since a magnetic flux interlinking the circuit substrate 13 or the like inside the electronic apparatus 10 is decreased, it becomes possible to suppress generation of an eddy current by electromagnetic induction. A thickness of the magnetic sheet 1 is preferable to be in a range of 1 mm or less in consideration of an installability, a harrier performance against the magnetic flux, or the like. The thickness of the magnetic sheet 1 includes thicknesses of an adhesive layer portion 3, a resin film 5 covering an external appearance, and so on. When an L value of the magnetic sheet 1 is given greater importance, it is preferable to dispose a second magnetic thin plate 4 having a high magnetic permeability in a spiral coil 16 side. When a Q value of the magnetic sheet 1 is given greater importance, it is preferable to dispose a first magnetic thin plate 2 which is hard to be magnetic-saturated in the spiral coil 16 side.

By suppressing an influence of an eddy current, heat generation of the electronic device 14 and the rectifier 17 mounted on the circuit substrate 13, heat generation of the circuit substrate 13, and generation of a noise caused by the eddy current are suppressed. Suppression of heat generation inside the electronic apparatus 10 contributes to improvement of a performance and a reliability of the secondary battery 18. By suppressing reduction of the Q value due to an eddy current loss, it is possible to increase a power supplied to the power receiving device 11. Since the magnetic sheet 1 functions also as a magnetic core to the spiral coil 16, a power receiving efficiency and a charging efficiency can be heightened. The above contributes to shortening of a charging time to the electronic apparatus 10. Further, since an eddy current generated in a casing of the secondary battery 18 can be suppressed, temperature rise of the secondary battery at the time of charging is small, not inviting deterioration of a life-time characteristic.

The magnetic sheet 1 of the embodiment described above is used as a magnetic substance for inductor, or a magnetic substance for magnetic shield (including antinoise sheet), for example. In particular, the magnetic sheet 1 is suitable as a magnetic sheet used at a frequency band of 100 kHz or more. In other words, the improvement effect of the Q value or the reduction effect of the eddy current loss based on the magnetic thin plate 2 having the incision portion 6 is exhibited better in the frequency band of 100 kHz or more. Therefore, the magnetic sheet 1 is suitable as a magnetic substance for inductor and a magnetic substance for magnetic shield which are used at the frequency band of 100 kHz or more.

In the power receiving device 11 of the embodiment and the electronic apparatus 10 using the same, since the eddy current caused by the magnetic flux interlinking the spiral coil 16 is suppressed, it becomes possible to reduce heat generation inside the apparatus and to improve the power receiving efficiency. Thereby, it is possible to enlarge a power at a time of power feeding and to shorten a charging time. The electronic apparatus 10 of this embodiment is suitable for a cellular phone, a portable audio device, a digital camera, a game device, and so on. Such an electronic apparatus 10 is set in a power feeding device and non-contact charging is carried out.

Figure 12:
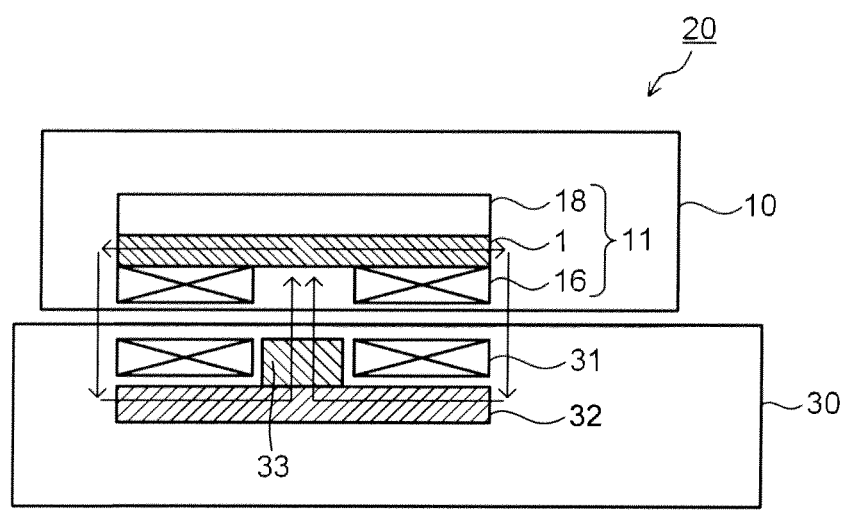
FIG. 12 is a view showing a schematic configuration of a non-contact charger according to the embodiment.

FIG. 12 shows a configuration of a non-contact charger according to an embodiment. A non-contact charger 20 has an electronic apparatus 10 and a power feeding device 30. In the non-contact charger 20, the electronic apparatus 10 is one shown in the aforementioned embodiment. The power feeding device 30 has a power feeding coil 31, a magnetic core 32 for power feeding coil, a magnet 33 positioning a power receiving device 11, and a not-shown power supply applying an alternating voltage to the power feeding coil 31. When the electronic apparatus 10 is set on the power feeding device 30, the power feeding coil 31 is disposed in non-contact with the power receiving coil 11. In FIG. 12, an arrow indicates a flow of a magnetic flux.

Charging by the non-contact charger 20 is carried out as below. An alternating voltage is applied from the power supply to the power feeding coil 31 of the power feeding device 30, to generate a magnetic flux in the power feeding coil 31. The magnetic flux generated in the power feeding coil 31 is transferred to a power receiving coil 16 disposed in non-contact with the power feeding coil 31. In the power receiving coil 16, when the magnetic flux is received, an alternating voltage is generated by electromagnetic induction. This alternating voltage is rectified by a rectifier 17. A direct-current voltage rectified by the rectifier 17 is charged to a secondary battery 18.

In the non-contact charger 20, transmission of a power is carried out in a non-contact manner. The power feeding device 30 shown in FIG. 12 has a magnet 33 for positioning the power receiving device 11. One magnet 33 is disposed in a center of the power feeding coil 31, but not limited thereto. The magnet 33 is not limited in particular as long as being a permanent magnet, but is preferable to be an Nd—Fe—B based magnet. Though various kinds are known as the permanent magnet, such as an Sm—Co based magnet and an Sm—Fe—N based magnet, the Nd—Fe—B based magnet is comparatively inexpensive and has a high versatility. The Nd—Fe—B based magnet can be a sintered magnet (sintered body of Nd—Fe—B based magnet powder), or can be a bond magnet (mixture of Nd—Fe—B based magnet power and resin).

The magnetic sheet 1 of the embodiment is not magnetic-saturated even if the magnet 33 is mounted on the power feeding device 30, and can be made to function well as a magnetic shield or an inductor. Therefore, it is possible to improve a power receiving efficiency of the power receiving device 11. The magnetic sheet 1 of the embodiment functions well as the magnetic shield or the inductor also in a case of applying a power feeding device 30 to which a magnet 33 for positioning the power receiving device 11 is not mounted. Therefore, also in a case of using the power feeding device 30 on which a magnet 33 is not mounted, a power receiving efficiency of a power receiving device 11 can be improved. A configuration of the power feeding device is similar to that of the power feeding device 30 shown in FIG. 12 except that a magnet 33 is not mounted thereon. In such a power feeding device, it is possible to position the power receiving device 11 by a movable coil.

EXAMPLES

Next, concrete examples of the present invention and evaluation results thereof will be described.
(First Non-Contact Charger)

As a first non-contact charger, a charging system for a cellular phone is prepared. A power feeding device converts a power from an AC power supply into a certain electromagnetic wave via a control circuit, and a primary coil (power feeding coil) transmitting this electromagnetic wave is disposed in a neighborhood of a holder. Note that in a center portion of the primary coil is disposed an Nd—Fe—B system sintered magnet (residual magnetic flux density (Br): 1.42 T, magnetic coercive force (Hc): 438 kA/m) with a diameter of 15 mm and a thickness of 0.5 mm. The cellular phone has, as a power receiving device, a secondary coil (power receiving coil) made of a spiral coil, a circuit substrate on which a rectifier rectifying an alternating-current power generated in the secondary coil is mounted, and a secondary battery. The secondary coil is made by winding a copper wire in a plane state to have an outer periphery of 30 mm and an inner periphery of 23 mm.
(Second Non-Contact Charger)

There is prepared a charging system for cellular phone which has a similar configuration except that a magnet is not disposed in the first non-contact charger, as a second non-contact charger.

Comparative Examples A, B

A comparative example A is a non-contact charger in which a power receiving device is constituted without using a magnetic sheet in the first non-contact charger. A comparative example B is a non-contact charger in which a power receiving device is constituted without using a magnetic sheet in the second non-contact charger.

Examples 1 to 12

As a first magnetic thin plate, a stainless steel thin plate with a thickness of 200 μm is fabricated through melting, casting, and rolling process steps. A composition of a stainless steel includes 0.01 mass % of C, 0.35 mass % of Si, 0.20 mass % of Mn, 0.024 mass % of P, 0.003 mass % of S, 18.8 mass % of Cr, 3.4 mass % of Al, 0.18 mass % of Ti, and 0.02 mass % of O, and a remainder is Fe. An electric resistance value of this material is 124 μΩ cm, a saturation magnetic flux density is 1.36 T, and a magnetostriction constant is 26 ppm in an absolute value. A heat treatment after rolling is not performed.

As a second magnetic thin plate, a Co-based amorphous alloy thin plate of a thickness of 18 μm is fabricated by a single-roll quenching method. A composition of the Co-based amorphous alloy thin plate is "$(Co_{0.90}Fe_{0.05}Nb_{0.02}Cr_{0.03})_{75}Si_{13}B_{12}$ (atomic %)". A magnetostriction constant of the above material is 1 ppm or less in an absolute value, a saturation magnetic flux density is 0.55 T, and an electric resistance value is 120 μΩ cm. The electric resistance is measured by a four-terminal method.

The saturation magnetic flux density is measured by a sample vibration type magnetometer. The magnetostriction constant is measured by a strain gauge method. A thickness of the first magnetic thin plate is measured by a micrometer. A thickness of the second magnetic thin plate is obtained by a weighing method.

Next, after the stainless steel thin plate is cut into a square shape of 42 mm by 42 mm, a required number of slits of a length of 40 mm is formed by an etching method so that an object incision portion size (B/A ratio) can be had. Note that all the slits penetrate from front to back, and widths (widths of the incision portions) of the slits are all 0 to 0.5 mm. The B/A ratio of each example is shown in Table 1. In the example 10 (B/A ratio=0), a incision portion is not provided. As an adhesive layer portion, a PET film (12.5 μm in thickness) to which an acrylic adhesive agent (10 μm in thickness) is applied is prepared. Two stainless steel thin plates and the adhesive layer portion are laminated alternately to form a first laminate. In forming the first laminate, one sheet of stainless steel (42 mm×42 mm) is cut into four small pieces (four small pieces of 21 mm×21 mm), and these small pieces are disposed as in FIG. 6. Distances between the small pieces, the distance being the width of the incision portion, are uniformly 0.2 mm.

Next, the Co-based amorphous alloy thin plate is cut into a square shape of 42 mm by 42 mm. Thereafter, a heat treatment at 440° C. is performed for 30 minutes. As an adhesive layer portion, a PET film (12.5 μm in thickness) to which an acrylic adhesive agent (10 μm in thickness) is applied is prepared. Two Co-based amorphous alloy thin plates and the adhesive layer portion are laminated alternately to form a second laminate. The second laminate is bend-processed, and incision portions segmenting into 8 segments as in FIG. 8 are formed. Since bend-processing is performed after the laminate of the Co-based amorphous alloy and the adhesive layer portion is formed, it is possible to make a width of the incision portion be in a range of 0 to 0.5 mm. The B/A ratio of the incision portion formed by the bend-processing is shown in Table 1. In the examples 1, 2 (B/A ratio=0), an incision portion is not provided.

The first laminate and the second laminate are laminated, and further a surface is completely covered by a resin film (25 μm in thickness), and thereby a magnetic sheet of the example is fabricated. In examples 2, 4, the first magnetic thin plate is disposed in a coil side, and in other examples, the second magnetic thin plate is disposed in the coil side. A thickness of the magnetic sheet is 0.54 mm.

Comparative Example 1

A laminate made by laminating two first magnetic thin plates of 9.5 in B/A ratio via the aforementioned adhesive layer portion is completely covered by a resin film (25 μm in thickness), to fabricate a magnetic sheet being a comparative example 1. The comparative example 1 is an example in which a second magnetic thin plate is not used.

Comparative Example 2

A laminate made by laminating two second magnetic thin plates before being provided with incision portions (not bend-processed) via the aforementioned adhesive layer portion is completely covered by a resin film (25 μm in thickness), to fabricate a magnetic sheet being a second comparative example. The comparative example 2 is an example in which a first magnetic thin plate is not used.

Comparative Example 3

An Fe-based microcrystalline alloy thin plate (composition: $Fe_{73}Cu_1Nb_3Si_{15}B_8$ (atomic %), average crystal grain diameter: 10 nm) of 20 μm in thickness obtained by a weighing method is processed into a square shape of 42 mm by 42 mm. Three Fe-based microcrystalline alloy thin plates as above are prepared. A heat treatment of 540° C.×1 hour is applied to the Fe-based microcrystalline alloy thin plates. A saturation magnetic flux density of this magnetic thin plate is 1.34 T, an electric resistance value is 120 μΩ cm, a magnetostriction constant is 1 ppm or less in an absolute value. Next, as an adhesive layer portion, a PET film (12.5 μm in thickness) to which an acrylic adhesive agent (10 μm in thickness) is applied is prepared, and the Fe-based microcrystalline alloy thin plates and the adhesive layer portion are laminated alternately to form a laminate. The laminate is completely covered by a resin film (25 μm in thickness), to fabricate a magnetic sheet being a comparative example 3. The comparative example 3 is also an example in which a first magnetic thin plate is not used.

For the magnetic sheets of the examples 1 to 12 and the comparative examples 1 to 3, a Q value and an L value are measured by using an impedance analyzer (HP4192A). In order to investigate an influence of whether or not a magnet for positioning an electronic apparatus (power receiving device) is disposed in a power feeding device side, measurements of the Q value and the L value are carried out under both conditions where the magnet exists/does not exist. In order to evaluate a characteristic as a non-contact charger, a coupling efficiency (power receiving efficiency) and a heating value are measured.

The coupling efficiency is evaluated by how much power is transferred to a secondary coil (power receiving coil) when a predetermined power (here, 1 W) is transmitted from a primary coil (power feeding coil). When the coupling efficiency (electric energy transferred to the secondary coil) of the comparative examples A, B is set to be 100, the coupling efficiency improved by 20% or more to less than 40% (120 or more to less than 140) is indicated as B, the one improved by 140% or more (140 or more) is indicated as A, the one improved by 10% or more to less than 20% (110 or more to less than 120) is indicated as C, and the one improved by less than 10% (less than 110) is indicated as D. A high coupling efficiency means a high power receiving efficiency.

With regard to the heating value, after power transmission at 0.4 W/h and at 1.5 W/h in power transmission speed is carried out for 2 hours, a temperature rise after 2 hours is measured. The heating value with the temperature rise of 10° C. or less is indicated as A, the one with the temperature rise exceeding 10° C. to 20° C. or less is indicated as B, the one with the temperature rise exceeding 20° C. to 30° C. or less is indicated as C, and the one with the temperature rise exceeding 30° C. is indicated as D. Room temperaturesbefore power transmission are uniformly 25° C. A small heat rise means that generation of an eddy current is prevented. Results thereof will be shown in Table 2.

TABLE 1

| | First magnetic thin plate | | | | Second magnetic thin plate | | | |
|---|---|---|---|---|---|---|---|---|
| | Magneto-striction [ppm] | Thickness [μm] | Number of plates | B/A ratio | Magneto-striction [ppm] | Thickness [μm] | Number of plates | B/A ratio |
| Example 1 | 26 | 200 | 2 | 4.0 | <1 | 18 | 2 | 0 |
| Example 2 | 26 | 200 | 2 | 4.0 | <1 | 18 | 2 | 0 |
| Example 3 | 26 | 200 | 2 | 6.0 | <1 | 18 | 2 | 0.5 |
| Example 4 | 26 | 200 | 2 | 6.0 | <1 | 18 | 2 | 0.5 |
| Example 5 | 26 | 200 | 2 | 8.0 | <1 | 18 | 2 | 0.5 |
| Example 6 | 26 | 200 | 2 | 11.0 | <1 | 18 | 2 | 1.0 |
| Example 7 | 26 | 200 | 2 | 15.0 | <1 | 18 | 2 | 1.0 |
| Example 8 | 26 | 200 | 2 | 21.0 | <1 | 18 | 2 | 1.2 |
| Example 9 | 26 | 200 | 2 | 25.0 | <1 | 18 | 2 | 1.2 |
| Example 10 | 26 | 200 | 2 | 0 | <1 | 18 | 2 | 1.2 |
| Example 11 | 26 | 200 | 2 | 2.0 | <1 | 18 | 2 | 1.2 |
| Example 12 | 26 | 200 | 2 | 28.0 | <1 | 18 | 2 | 1.2 |
| Comparative Example 1 | 26 | 200 | 2 | 9.5 | — | — | — | — |
| Comparative Example 2 | — | — | — | — | <1 | 18 | 2 | 0 |
| Comparative Example 3 | — | — | — | — | <1 | 20 | 3 | 0 |

TABLE 2

| | Without magnet | | | | | With magnet | | | | |
|---|---|---|---|---|---|---|---|---|---|---|
| | L [μH] | Q | Coupling | Heat generation (0.4 W/h) | Heat generation (1.5 W/h) | L [μH] | Q | Coupling | Heat generation (0.4 W/h) | Heat generation (1.5 W/h) |
| E1 | 21.6 | 19.6 | B | A | A | 14.3 | 10.1 | B | A | A |
| E2 | 20.3 | 20.6 | A | A | B | 13.9 | 10.5 | A | A | A |
| E3 | 21.4 | 19.9 | B | A | A | 14.2 | 10.6 | A | A | A |
| E4 | 20.1 | 21.0 | A | A | B | 13.8 | 10.9 | A | A | A |
| E5 | 21.4 | 20.3 | A | A | A | 14.2 | 10.8 | A | A | A |
| E6 | 21.2 | 20.6 | A | A | A | 14.0 | 11.2 | A | A | A |
| E7 | 21.1 | 20.8 | A | A | A | 13.7 | 11.5 | A | A | A |
| E8 | 20.6 | 21.0 | A | A | A | 13.4 | 11.7 | A | A | B |
| E9 | 20.1 | 21.2 | A | B | B | 12.5 | 11.9 | A | B | B |
| E10 | 21.7 | 18.4 | C | A | A | 14.4 | 8.6 | C | A | A |
| E11 | 21.7 | 18.9 | C | A | A | 14.3 | 9.7 | C | A | A |
| E12 | 19.6 | 21.3 | A | B | C | 12.0 | 12.0 | A | B | C |
| CE1 | 16.3 | 17.4 | D | D | D | 13.7 | 12.4 | A | A | A |
| CE2 | 22.3 | 21.4 | A | A | A | 8.4 | 7.8 | D | D | D |
| CE3 | 21.5 | 19.2 | B | A | A | 8.7 | 7.6 | D | D | D |

E1 to E12 = Example 1 to Example 12; CE1 to CE3 = Comparative Example 1 to Comparative Example 3

As is obvious from Table 2, it is confirmed that the magnetic sheets of examples 1 to 12 exhibit good characteristics regardless of existence/absence of the magnet. In particular, the one provided with the incision portion exhibits better characteristics. As in the comparative example 1, the magnetic sheet formed only by the stainless steel cannot obtain a characteristic endurable for practical use, under a circumstance where the magnet is absent. The magnetic sheets of the comparative example 2 and the comparative example 3 cannot obtain a characteristic endurable for practical use, under a circumstance where the magnet exists.

Examples 13 to 41

As a first magnetic thin plate, a stainless steel thin plate having a composition shown in Table 3 is prepared. The stainless steel thin plates slitted from a wide thin plate are aligned to form a magnetic sheet similarly to in the example 1. A characteristic of each material is measured by a method similar to that in the example 1. Results thereof are shown in Table 4. As a second magnetic thin plate, a Co-based amorphous alloy thin plate and an Fe-based microcrystalline alloy thin plate shown in Table 5 are prepared. Samples a to f are Co-based amorphous alloys and samples g to j are Fe-based microcrystalline alloys having fine crystal grains of 5 to 30 nm in average crystal grain diameter by 20% or more in area ratio. The second magnetic thin plates are segmented into four or segmented into eight as shown in FIG. 7 and FIG. 8. A characteristic of each material is measured by a method similar to that of the example 1. Results thereof are shown in Table 6.

TABLE 3

First magnetic thin plate

| | Composition (mass %) | | | | | | | | | |
|---|---|---|---|---|---|---|---|---|---|---|
| Sample | Fe | C | Si | Mn | Al | Cr | P | S | O | Others |
| 1 | bal. | 0.010 | 0.30 | 0.20 | 3.00 | 18.4 | 0.024 | 0.003 | 0.004 | Ti: 0.018 |
| 2 | bal. | 0.030 | 1.47 | 0.24 | 0.80 | 12.5 | 0.024 | 0.003 | 0.002 | Ti: 0.014 |
| 3 | bal. | 0.015 | 0.25 | 0.20 | 3.30 | 18.0 | 0.020 | 0.004 | 0.005 | — |
| 4 | bal. | 0.013 | 0.40 | 0.22 | 3.50 | 19.0 | 0.021 | 0.003 | 0.006 | Sn: 0.45 |
| 5 | bal. | 0.016 | 0.52 | 0.20 | 3.90 | 19.4 | 0.018 | 0.005 | 0.004 | Sb: 0.24 |
| 6 | bal. | 0.010 | 0.38 | 0.24 | 4.40 | 17.8 | 0.019 | 0.003 | 0.007 | B: 0.013 |
| 7 | bal. | 0.005 | 0.10 | 0.10 | 5.50 | 20.1 | 0.016 | 0.004 | 0.008 | La: 0.08 |
| 8 | bal. | 0.003 | 0.10 | 0.10 | 3.50 | 18.2 | 0.020 | 0.003 | 0.004 | La: 0.08 |
| 9 | bal. | 0.004 | 0.11 | 0.09 | 4.50 | 19.1 | 0.016 | 0.003 | 0.005 | Ce: 0.06 |
| 10 | bal. | 0.005 | 0.09 | 0.10 | 5.90 | 17.8 | 0.018 | 0.004 | 0.003 | Y: 0.02 |
| 11 | bal. | 0.005 | 0.10 | 0.11 | 6.30 | 18.8 | 0.020 | 0.005 | 0.003 | Pr: 0.04 |
| 12 | bal. | 0.003 | 0.11 | 0.12 | 4.00 | 20.4 | 0.015 | 0.003 | 0.004 | Nd: 0.03 |
| 13 | bal. | 0.010 | 0.30 | 0.18 | 4.00 | 15.1 | 0.020 | 0.010 | 0.007 | — |
| 14 | bal. | 0.030 | 1.20 | 0.22 | 0.10 | 12.5 | 0.020 | 0.010 | 0.008 | — |
| 15 | bal. | 0.020 | 0.80 | 0.20 | 2.60 | 16.9 | 0.020 | 0.012 | 0.009 | — |
| 16 | bal. | 0.025 | 0.60 | 0.21 | 3.40 | 17.5 | 0.020 | 0.014 | 0.005 | Ni: 1.4 |
| 17 | bal. | 0.022 | 0.43 | 0.22 | 4.20 | 18.8 | 0.015 | 0.010 | 0.004 | Co: 2.2 |
| 18 | bal. | 0.028 | 0.47 | 0.18 | 3.50 | 18.1 | 0.020 | 0.013 | 0.003 | Cu: 0.9 |
| 19 | bal. | 0.008 | 0.90 | 0.15 | 1.00 | 18.1 | 0.018 | 0.003 | 0.004 | — |
| 20 | bal. | 0.010 | 1.30 | 0.12 | 1.45 | 24.0 | 0.016 | 0.003 | 0.006 | — |
| 21 | bal. | 0.010 | 1.20 | 0.12 | 2.00 | 26.0 | 0.015 | 0.003 | 0.007 | Mo: 0.015 |
| 22 | bal. | 0.015 | 1.40 | 0.12 | 1.88 | 23.0 | 0.015 | 0.005 | 0.007 | Ta: 0.012 |
| 23 | bal. | 0.015 | 1.00 | 0.12 | 1.65 | 21.0 | 0.017 | 0.003 | 0.005 | W: 0.010 |
| 24 | bal. | 0.013 | 0.90 | 0.12 | 1.70 | 20.0 | 0.015 | 0.003 | 0.005 | V: 0.014 |
| 25 | bal. | 0.010 | 0.72 | 0.14 | 0.40 | 14.6 | 0.020 | 0.004 | 0.006 | Ca: 0.15 |
| 26 | bal. | 0.020 | 0.30 | 0.20 | 0 | 17.0 | 0.020 | 0.005 | 0.006 | Ni: 0.4 |
| 27 | bal. | 0.020 | 0.30 | 0.20 | 0 | 13.1 | 0.020 | 0.005 | 0.006 | Ni: 0.5 |
| 28 | bal. | 0.015 | 0.50 | 0.15 | 0 | 2.5 | 0.020 | 0.005 | 0.006 | — |
| 29 | bal. | 0.020 | 0.30 | 0.20 | 0 | 1.2 | 0.020 | 0.005 | 0.006 | Ni: 77 Nb: 1.5 |

TABLE 4

First magnetic thin plate

| Sample | Thickness (μm) | Electric resistance value [μΩcm] | Saturation magnetic flux density [T] | Magneto-striction constant [ppm] | Heat treatment | Width of incision portion [mm] | B/A ratio |
|---|---|---|---|---|---|---|---|
| 1 | 100 | 120 | 1.39 | 26 | No | 0.10 | 9.5 |
| 2 | 100 | 95 | 1.43 | 24 | No | 0.10 | 9.5 |
| 3 | 150 | 128 | 1.41 | 27 | No | 0.10 | 9.5 |
| 4 | 150 | 130 | 1.33 | 24 | No | 0.10 | 9.5 |
| 5 | 200 | 138 | 1.30 | 25 | No | 0 | 9.5 |
| 6 | 300 | 142 | 1.39 | 26 | No | 0 | 9.5 |
| 7 | 100 | 145 | 1.33 | 24 | No | 0.10 | 9.5 |
| 8 | 100 | 115 | 1.38 | 23 | No | 0.10 | 12.0 |
| 9 | 50 | 135 | 1.36 | 26 | No | 0.20 | 12.0 |
| 10 | 150 | 148 | 1.40 | 25 | No | 0.30 | 12.0 |
| 11 | 200 | 152 | 1.31 | 23 | No | 0.30 | 12.0 |
| 12 | 300 | 122 | 1.30 | 23 | No | 0.35 | 12.0 |
| 13 | 100 | 125 | 1.41 | 28 | No | 0.45 | 12.0 |
| 14 | 100 | 95 | 1.56 | 25 | Yes | 0.15 | 12.0 |
| 15 | 100 | 104 | 1.38 | 26 | No | 0.10 | 12.0 |
| 16 | 150 | 108 | 1.35 | 25 | No | 0.15 | 12.0 |
| 17 | 150 | 128 | 1.37 | 25 | No | 0.20 | 12.0 |
| 18 | 200 | 111 | 1.39 | 24 | No | 0.25 | 12.0 |
| 19 | 100 | 90 | 1.36 | 26 | No | 0.20 | 6.5 |
| 20 | 100 | 110 | 1.24 | 21 | No | 0.15 | 8.5 |
| 21 | 150 | 114 | 1.20 | 20 | No | 0.15 | 8.0 |
| 22 | 150 | 116 | 1.27 | 22 | No | 0.15 | 22.5 |
| 23 | 200 | 98 | 1.31 | 24 | No | 0.15 | 22.5 |
| 24 | 200 | 100 | 1.34 | 25 | No | 0.10 | 9.5 |
| 25 | 300 | 81 | 1.49 | 27 | Yes | 0.10 | 9.5 |
| 26 | 200 | 60 | 1.40 | 26 | No | 0.20 | 10.5 |
| 27 | 200 | 55 | 1.51 | 26 | No | 0.20 | 10.5 |
| 28 | 200 | 45 | 1.86 | 3 | No | 0.20 | 10.5 |
| 29 | 200 | 55 | 1.51 | <1 | Yes | 0.20 | 10.5 |

TABLE 5

Second magnetic thin plate

| Sample | Composition [mass %] |
|---|---|
| a | $(Co_{0.90}Fe_{0.05}Cr_{0.03}Nb_{0.02})_{75}Si_{13}B_{12}$ |
| b | $(Co_{0.90}Fe_{0.05}Cr_{0.03}Nb_{0.02})_{75}Si_{13}B_{12}$ |
| c | $(Co_{0.95}Fe_{0.05})_{71}Si_{15}B_{10}$ |
| d | $(Co_{0.95}Fe_{0.05})_{71}Si_{15}B_{10}$ |
| e | $(Co_{0.83}Fe_{0.05}Ni_{0.03}Cr_{0.04}Mo_{0.05})_{77}Si_{10}B_{13}$ |
| f | $(Co_{0.89}Fe_{0.03}Mn_{0.03}Cr_{0.03}Nb_{0.02})_{75}Si_{13}B_{12}$ |
| g | $Fe_{73}Cu_1Nb_3Si_{15}B_8$ |
| h | $Fe_{74}Cu_1Nb_3Si_{15}B_9$ |
| i | $Fe_{74}Cu_1Nb_3Si_{16}B_6$ |
| j | $Fe_{73}Cu_1Mo_3Si_{14}B_9$ |

TABLE 6

Second magnetic thin plate

| Sample | Thickness [μm] | Electric resistance value [μΩcm] | Saturation magnetic flux density [T] | Magnetostriction constant [ppm] | Heat treatment | B/A ratio |
|---|---|---|---|---|---|---|
| a | 18 | 120 | 0.55 | <1 | 440° C. × 0.5 h | 1.2 |
| b | 18 | 120 | 0.55 | <1 | No | 1.2 |
| c | 15 | 115 | 0.57 | <1 | 440° C. × 0.5 h | 1.2 |
| d | 15 | 115 | 0.57 | <1 | No | 0.5 |
| e | 24 | 128 | 0.60 | <1 | 440° C. × 0.5 h | 0.5 |
| f | 28 | 130 | 0.54 | <1 | 440° C. × 0.5 h | 0.5 |
| g | 20 | 120 | 1.34 | <1 | 540° C. × 1 h | 1.2 |
| h | 20 | 115 | 1.37 | 1.5 | 560° C. × 1 h | 1.2 |
| i | 13 | 115 | 1.32 | <1 | 520° C. × 3 h | 0.5 |
| j | 25 | 120 | 1.35 | 1.0 | 580° C. × 3 h | 0.5 |

Next, the stainless steel thin plate shown in Table 3 and Table 4 and the Co-based amorphous alloy thin plate or the Fe-based microcrystalline alloy thin plate shown in Table 5 and Table 6 are combined as shown in Table 7, to fabricate a magnetic sheet. The magnetic sheet is fabricated similarly to in the example 1. All thicknesses of the magnetic sheets are 0.6 mm or less. A characteristic of a non-contact charger in which the magnetic sheet is used is measured similarly to in the example 1. Results thereof are shown in Table 8.

Comparative Examples 4 to 5

As a comparative example 4, MnZn ferrite sintered body chips of 1.8 mm square are aligned to have the same size as the example by filling a resin between the chips, to fabricate a magnetic sheet of 0.4 mm in thickness. As a comparative example 5, a mixture of a sendust powder and a resin is formed into a sheet shape, to fabricate a composite flexible sheet of 0.4 mm in thickness. Similar measurements are carried out also for the comparative examples 4 to 5. Results thereof are shown together in Table 8.

TABLE 7

| | First magnetic thin plate | | Second magnetic thin plate | |
|---|---|---|---|---|
| | Sample | Number of plates | Sample | Number of plates |
| Example 13 | 1 | 2 | a | 2 |
| Example 14 | 2 | 3 | b | 2 |
| Example 15 | 3 | 2 | c | 2 |
| Example 16 | 4 | 3 | d | 2 |
| Example 17 | 5 | 1 | e | 5 |
| Example 18 | 6 | 1 | f | 4 |
| Example 19 | 7 | 2 | a | 2 |
| Example 20 | 8 | 3 | b | 2 |
| Example 21 | 9 | 5 | c, g | 1 each |
| Example 22 | 10 | 2 | d | 2 |
| Example 23 | 11 | 2 | e | 2 |
| Example 24 | 12 | 1 | f | 2 |
| Example 25 | 13 | 2 | a | 2 |
| Example 26 | 14 | 3 | b | 2 |
| Example 27 | 15 | 4 | c | 1 |
| Example 28 | 16 | 2 | d | 2 |
| Example 29 | 17 | 2 | e, g | 1 each |
| Example 30 | 18 | 1 | f | 2 |
| Example 31 | 19 | 2 | g | 3 |
| Example 32 | 20 | 3 | h | 2 |
| Example 33 | 21 | 2 | i | 2 |
| Example 34 | 22 | 2 | j | 1 |
| Example 35 | 23 | 2 | g | 2 |
| Example 36 | 24 | 1 | h | 2 |
| Example 37 | 25 | 1 | i | 2 |
| Example 38 | 26 | 2 | a | 2 |
| Example 39 | 27 | 2 | a | 3 |
| Example 40 | 28 | 2 | a | 3 |
| Example 41 | 29 | 2 | a | 3 |

TABLE 8

| | Without magnet | | | | | With magnet | | | | |
|---|---|---|---|---|---|---|---|---|---|---|
| | L [μH] | Q | Coupling efficiency | Heat generation (0.4 W/h) | Heat generation (1.5 W/h) | L [μH] | Q | Coupling efficiency | Heat generation (0.4 W/h) | Heat generation (1.5 W/h) |
| E13 | 21.8 | 20.9 | A | A | A | 13.6 | 12.5 | A | A | A |
| E14 | 23.1 | 19.7 | B | A | A | 14.1 | 11.3 | B | A | A |
| E15 | 22.0 | 20.6 | A | A | A | 13.5 | 12.1 | A | A | A |
| E16 | 23.0 | 19.4 | B | A | A | 14.5 | 11.4 | B | A | A |
| E17 | 21.8 | 20.0 | A | A | A | 14.4 | 12.0 | A | A | A |
| E18 | 22.1 | 21.1 | A | A | A | 14.2 | 12.2 | A | A | A |
| E19 | 22.0 | 21.3 | A | A | A | 13.2 | 12.5 | A | A | B |
| E20 | 23.3 | 19.7 | B | A | A | 14.3 | 11.3 | B | A | A |
| E21 | 21.2 | 20.0 | A | A | A | 13.5 | 12.0 | A | A | A |
| E22 | 23.4 | 19.5 | B | A | A | 14.3 | 11.3 | B | A | A |
| E23 | 21.8 | 21.3 | A | A | A | 13.9 | 12.8 | A | A | A |
| E24 | 20.6 | 21.1 | A | A | B | 13.0 | 12.5 | A | A | A |
| E25 | 21.8 | 20.6 | A | A | A | 13.7 | 12.2 | A | A | B |
| E26 | 23.5 | 19.3 | B | B | B | 14.0 | 11.3 | B | A | A |
| E27 | 21.5 | 20.2 | A | A | A | 13.9 | 12.1 | A | A | A |
| E28 | 23.8 | 19.6 | B | A | A | 14.3 | 11.0 | B | A | A |

TABLE 8-continued

| | Without magnet | | | | | With magnet | | | |
|---|---|---|---|---|---|---|---|---|---|
| | L [μH] | Q | Coupling efficiency | Heat generation (0.4 W/h) | Heat generation (1.5 W/h) | L [μH] | Q | Coupling efficiency | Heat generation (0.4 W/h) | Heat generation (1.5 W/h) |
| E29 | 22.2 | 20.8 | A | A | A | 14.1 | 12.3 | A | A | A |
| E30 | 21.8 | 20.9 | A | A | A | 14.1 | 12.5 | A | A | A |
| E31 | 21.4 | 20.3 | A | A | A | 13.0 | 12.0 | A | A | B |
| E32 | 20.9 | 20.8 | A | A | B | 13.2 | 12.2 | A | A | B |
| E33 | 20.6 | 20.9 | A | A | B | 12.9 | 12.5 | A | A | B |
| E34 | 20.1 | 20.7 | A | B | B | 12.5 | 12.2 | A | B | B |
| E35 | 20.5 | 20.8 | A | A | B | 12.9 | 12.5 | A | B | B |
| E36 | 20.8 | 20.5 | A | A | B | 13.3 | 12.2 | A | A | B |
| E37 | 20.4 | 18.6 | B | B | B | 13.1 | 10.3 | B | A | B |
| E38 | 19.6 | 17.8 | C | C | C | 11.8 | 9.8 | C | C | C |
| E39 | 19.9 | 18.2 | C | B | C | 12.2 | 9.9 | C | B | C |
| E40 | 19.4 | 18.1 | C | C | C | 12.0 | 9.6 | C | B | C |
| E41 | 19.3 | 18.0 | C | C | C | 11.7 | 9.5 | C | C | C |
| CE4 | 18.8 | 20.9 | A | C | D | 11.2 | 12.5 | A | C | D |
| CE5 | 17.9 | 21.3 | A | D | D | 10.0 | 12.4 | A | D | D |

E13 to E41 = Example 13 to Example 41; CE4 to CE5 = Comparative Example 4 to Comparative Example 5

As is obvious from FIG. 8, it is confirmed that the magnetic sheet of the example exhibits an excellent characteristic. In particular, as the first magnetic thin plate, by using the magnetic thin plate satisfying two or more conditions or further three or more conditions of having a thickness in a range of 50 to 300 μm, a magnetostriction constant exceeding 5 ppm in an absolute value, a saturation magnetic flux density in a range of 1 to 2.1 T, and an electric resistance value of 80 μΩ cm or more, a better characteristic can be obtained. The non-contact charger using the magnetic sheet according to the example has a high coupling efficiency, and further, its heating value is suppressed to be low. In particular, it is confirmed that the excellent characteristic is exhibited even under an environment where magnetic saturation is apt to occur by a magnet disposed in a power feeding device side.

In contrast, it is confirmed that a non-contact charger in which the magnetic sheet of the comparative example is used has a low coupling efficiency and a high heating value. This is because the magnetic sheet of the comparative example is magnetic-saturated in a case where a magnet is disposed in a power feeding device side. In other words, the magnetic sheet of the example is particularly effective for the non-contact charger in which the magnet is disposed in the power feeding device side. Further, the magnetic sheet of the example is suitable for a non-contact charger whose power transmission speed is 0.4 W/h or more.

Examples 1A to 41A

As a non-contact charger using a magnetic sheet of the examples 1 to 41, a charging system for a cellular phone is constructed. A power feeding device converts a power from an AC power supply (0.5 A or 1.0 A) into a predetermined electromagnetic wave through a control circuit, and a primary coil (power feeding coil) transmitting this electromagnetic wave is disposed in a neighborhood of a holder. As a magnet, an Nd—Fe—B system bond magnet (Br: 0.75 T, Hc: 756 kA/m), an Sm—Co system sintered magnet (Br: 1.02 T, Hc: 796 kA/m), and a ferrite sintered magnet (Br: 0.43 T, Hc: 398 kA/m) are prepared, and any one of the above is disposed in a center portion of the primary coil. The cellular phone has, as a power receiving device, a secondary coil (power receiving coil) made of a spiral coil, a circuit substrate on which a rectifier rectifying an alternate-current power generated in the secondary coil is mounted, and a secondary battery. The secondary coil is made by winding a copper wire in a flat shape of an outer periphery of 30 mm and an inner periphery of 23 mm.

In cases of the AC power supply current of 0.5 A and 1.0 A, a coupling efficiency and a heating value of the non-contact charger are measured. Characteristic evaluations of the non-contact chargers are carried out in cases of using the aforementioned Nd—Fe—B system bond magnet, the Sin-Co system sintered magnet, and the ferrite sintered magnet, respectively. The coupling efficiency is evaluated by how much power can be transferred to the secondary coil (power receiving coil) when a predetermined power (here, 1 W) is transmitted from the primary coil (power feeding coil) with the AC power supply current being 0.5 A or 1.0 A. When the coupling efficiency (electric energy transferred to the secondary coil) of the comparative examples A is set to be 100, the coupling efficiency improved by 20% or more to less than 40% (120 or more to less than 140) is indicated as B, the one improved by 140% or more (140 or more) is indicated as A, and the one improved by less than 20% (less than 120) is indicated as C. With regard to a heating value, after power transmission of the AC power supply current of 0.5 A or 1.0 A is carried out for 2 hours, a temperature rise after 2 hours is measured. The heating value with the temperature rise of 25° C. or less is indicated as A, the one with the temperature rise exceeding 25° C. to 40° C. or less is indicated as B, and the one with the temperature rise exceeding 40° C. is indicated as C. Room temperatures before power transmission are uniformly 25° C. Results thereof are shown in Table 9 and Table 10.

TABLE 9

| | Coupling efficiency | | | | | |
|---|---|---|---|---|---|---|
| | 0.5 A | | | 1.0 A | | |
| | SmCo based sintered magnet | NdFeB based bond magnet | Ferrite sintered magnet | SmCo based sintered magnet | NdFeB based bond magnet | Ferrite sintered magnet |
| Example 1A | B | B | B | B | B | B |
| Example 2A | A | A | A | A | A | A |
| Example 3A | A | A | A | A | A | A |
| Example 4A | A | A | A | A | A | A |
| Example 5A | A | A | A | A | A | A |
| Example 6A | A | A | A | A | A | A |
| Example 7A | A | A | A | A | A | A |
| Example 8A | A | A | A | A | A | A |
| Example 9A | A | A | A | A | A | A |
| Example 10A | B | B | A | C | B | B |
| Example 11A | B | B | A | C | B | B |
| Example 12A | A | A | A | A | A | A |
| Example 13A | A | A | A | A | A | A |
| Example 14A | B | A | A | B | B | A |
| Example 15A | A | A | A | A | A | A |
| Example 16A | B | B | A | B | B | A |
| Example 17A | A | A | A | A | A | A |
| Example 18A | A | A | A | A | A | A |
| Example 19A | A | A | A | A | A | A |
| Example 20A | B | A | A | B | B | A |
| Example 21A | A | A | A | A | A | A |
| Example 22A | B | A | A | B | B | A |
| Example 23A | A | A | A | A | A | A |
| Example 24A | A | A | A | A | A | A |
| Example 25A | A | A | A | A | A | A |
| Example 26A | B | A | A | B | B | A |
| Example 27A | A | A | A | A | A | A |
| Example 28A | B | B | A | B | B | A |
| Example 29A | A | A | A | A | A | A |
| Example 30A | A | A | A | A | A | A |
| Example 31A | A | A | A | A | A | A |
| Example 32A | A | A | A | A | A | A |
| Example 33A | A | A | A | A | A | A |
| Example 34A | A | A | A | A | A | A |
| Example 35A | A | A | A | A | A | A |
| Example 36A | A | A | A | A | A | A |
| Example 37A | B | B | A | B | B | A |
| Example 38A | C | B | A | C | C | B |
| Example 39A | C | B | A | C | C | B |
| Example 40A | C | B | A | C | C | B |
| Example 41A | C | B | A | C | C | B |

TABLE 10

| | Heating value | | | | | |
|---|---|---|---|---|---|---|
| | 0.5 A | | | 1.0 A | | |
| | SmCo based sintered magnet | NdFeB based bond magnet | Ferrite sintered magnet | SmCo based sintered magnet | NdFeB based bond magnet | Ferrite sintered magnet |
| Example 1A | A | A | A | A | A | A |
| Example 2A | A | A | A | A | A | A |
| Example 3A | A | A | A | A | A | A |
| Example 4A | A | A | A | A | A | A |
| Example 5A | A | A | A | A | A | A |
| Example 6A | A | A | A | A | A | A |
| Example 7A | A | A | A | A | A | A |
| Example 8A | A | A | A | B | B | A |
| Example 9A | B | B | A | B | B | A |
| Example 10A | A | A | A | A | A | A |
| Example 11A | A | A | A | A | A | A |
| Example 12A | B | A | A | B | A | A |
| Example 13A | A | A | A | A | A | A |
| Example 14A | A | A | A | A | A | A |
| Example 15A | A | A | A | A | A | A |
| Example 16A | A | A | A | A | A | A |
| Example 17A | A | A | A | A | A | A |

TABLE 10-continued

| | Heating value | | | | | |
| --- | --- | --- | --- | --- | --- | --- |
| | 0.5 A | | | 1.0 A | | |
| | SmCo based sintered magnet | NdFeB based bond magnet | Ferrite sintered magnet | SmCo based sintered magnet | NdFeB based bond magnet | Ferrite sintered magnet |
| Example 18A | A | A | A | A | A | A |
| Example 19A | A | A | A | B | B | A |
| Example 20A | A | A | A | A | A | A |
| Example 21A | A | A | A | A | A | A |
| Example 22A | A | A | A | A | A | A |
| Example 23A | A | A | A | A | A | A |
| Example 24A | A | A | A | B | B | A |
| Example 25A | A | A | A | A | A | A |
| Example 26A | A | A | A | A | A | A |
| Example 27A | A | A | A | A | A | A |
| Example 28A | A | A | A | A | A | A |
| Example 29A | A | A | A | A | A | A |
| Example 30A | A | A | A | A | A | A |
| Example 31A | A | A | A | B | B | A |
| Example 32A | A | A | A | B | B | A |
| Example 33A | A | A | A | B | B | A |
| Example 34A | B | B | A | B | B | A |
| Example 35A | B | B | A | B | B | A |
| Example 36A | A | A | A | B | B | A |
| Example 37A | A | A | A | B | B | A |
| Example 38A | C | B | B | C | C | B |
| Example 39A | B | B | B | C | C | B |
| Example 40A | B | B | B | C | C | B |
| Example 41A | C | B | B | C | C | B |

As is obvious from Table 9 and Table 10, it is confirmed that the magnetic sheet of the example exhibits an excellent characteristic even in a case where a current value of the AC power supply is changed. Further, it is confirmed that the magnetic sheet of the example exhibits an excellent characteristic also in a case where the magnet is changed. Hence, it is possible to materialize improvement of the power receiving efficiency and reduction of the heating value by the magnetic sheet of the example, even in a case where the AC power supply changes or a material of the magnet for positioning is changed. Therefore, it becomes possible to substantially heighten a reliability or a versatility of the power receiving device or the non-contact charger.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic sheet for non-contact power receiving device, comprising:
a laminate including a first magnetic thin plate and a second magnetic thin plate laminated to the first magnetic thin plate via an adhesive layer portion,
wherein the first magnetic thin plate is made of a stainless steel, and has a thickness of from 50 μm to 300 μm,
wherein the second magnetic thin plate is made of a Co-based amorphous alloy or an Fe-based microcrystalline alloy having an average crystal grain diameter of from 5 nm to 30 nm, and has a thickness of from 10 μm to 30 μm, and
wherein the magnetic sheet is configured to be used for the non-contact power receiving device.

2. The magnetic sheet according to claim 1,
wherein the first magnetic thin plate has a magnetostriction constant exceeding 5 ppm in an absolute value and the second magnetic thin plate has a magnetostriction constant of 5 ppm or less in an absolute value.

3. The magnetic sheet according to claim 2,
wherein the first magnetic thin plate has the magnetostriction constant exceeding 5 ppm to 30 ppm or less in the absolute value, and
wherein the second magnetic thin plate has the magnetostriction constant of 2 ppm or less (including zero) in the absolute value.

4. The magnetic sheet according to claim 2,
wherein the laminate includes the one or more to four or less first magnetic thin plate(s) and the one or more to four or less second magnetic thin plate(s).

5. The magnetic sheet according to claim 2,
wherein the first magnetic thin plate has an electric resistance value of 80 μΩ cm or more.

6. The magnetic sheet according to claim 2,
wherein the first magnetic thin plate has a saturation magnetic flux density of from 1 to 2.1 T.

7. The magnetic sheet according to claim 1,
wherein at least one of the first and second magnetic thin plates is provided with a incision portion with a width of 1 mm or less (including 0), and
wherein a ratio (B/A) of a total length B of the incision portion(s) in relation to a total outer peripheral length A of outer peripheral regions of the magnetic thin plate(s) disposed on the same plane is in a range of 2 to 25.

8. The magnetic sheet according to claim 7,
wherein the laminate has the two or more magnetic thin plates different in the ratio (B/A) of the total length B of the incision portion(s) in relation to the total outer peripheral length A of the magnetic thin plate.

9. A non-contact power receiving device, comprising:
a power receiving coil including a spiral coil;
a rectifier rectifying an alternating voltage generated in the power receiving coil;
a secondary battery to which a direct-current voltage rectified by the rectifier is charged; and
a magnetic sheet according to claim 1, disposed in at least one of places between the spiral coil and the secondary battery and between the spiral coil and the rectifier.

10. An electronic apparatus comprising:
a non-contact power receiving device comprising: a power receiving coil including a spiral coil; a rectifier rectifying an alternating voltage generated in the power receiving coil; and a secondary battery to which a direct-current voltage rectified by the rectifier is charged;
an electronic apparatus main body comprising: an electronic device operating when the direct-current voltage is supplied from the secondary battery; and a circuit substrate on which the electronic device is mounted; and
a magnetic sheet according to claim 1, disposed at least one of places between the spiral coil and the secondary battery, between the spiral coil and the rectifier, between the spiral coil and the electronic device, and between the spiral coil and the circuit substrate.

11. A non-contact charger, comprising:
an electronic apparatus according to claim 10; and
a power feeding device comprising: a power feeding coil disposed in non-contact with the power receiving coil of the electronic apparatus; a power supply applying an alternating voltage to the power feeding coil; and a magnet for positioning,
wherein the electronic apparatus is positioned by the magnet and a magnetic flux generated in the power feeding coil is transferred to the power receiving coil to transmit a power in a non-contact manner.

12. A non-contact charger comprising:
an electronic apparatus according to claim 10;
a power feeding device comprising: a power feeding coil disposed in non-contact with the power receiving coil of the electronic apparatus; and a power supply applying an alternating voltage to the power feeding coil,
wherein a magnetic flux generated in the power feeding coil is transferred to the power receiving coil to transmit a power in a non-contact manner.

13. The non-contact charger according to claim 12, wherein the electronic apparatus is positioned by a movable coil disposed in a power feeding device side.

* * * * *